United States Patent [19]

Matyas et al.

[11] Patent Number: 4,924,515
[45] Date of Patent: May 8, 1990

[54] SECURE MANAGEMENT OF KEYS USING EXTENDED CONTROL VECTORS

[75] Inventors: Stephen M. Matyas, Manassas, Va.; Dennis G. Abraham, Concord, N.C.; William C. Arnold, Mahopac, N.Y.; Donald B. Johnson, Manassas; Ramesh K. Karne, Herndon; An V. Le, Arlington; Rostislaw Prymak, Dumfries, all of Va.; Steve R. White, New York, N.Y.; John D. Wilkins, Somerville, Va.

[73] Assignee: International Business Machines Coprporation, Armonk, N.Y.

[21] Appl. No.: 398,299

[22] Filed: Aug. 24, 1989

Related U.S. Application Data

[63] Continuation of Ser. No. 238,010, Aug. 29, 1988, abandoned.

[51] Int. Cl.$^5$ .............................................. H04L 9/02
[52] U.S. Cl. ...................................... 380/25; 380/45; 380/49
[58] Field of Search ............................ 380/21, 23–25, 380/45–49

[56] References Cited

U.S. PATENT DOCUMENTS

| | | | |
|---|---|---|---|
| 4,218,738 | 8/1980 | Matyas et al. | 380/25 |
| 4,223,403 | 9/1980 | Konheim et al. | 380/24 |
| 4,227,253 | 10/1980 | Ehrsam et al. | 380/49 |
| 4,386,623 | 8/1983 | Smid et al. | 380/25 |
| 4,500,750 | 2/1985 | Elander et al. | 380/21 |
| 4,503,287 | 3/1985 | Morris et al. | 380/45 |
| 4,578,536 | 3/1986 | Zeidler | 380/24 |
| 4,633,037 | 12/1986 | Serpell | 380/24 |
| 4,683,968 | 8/1987 | Applebaum et al. | 380/24 |
| 4,713,753 | 12/1987 | Boebert et al. | 380/25 |
| 4,723,283 | 2/1988 | Nasagawa et al. | 380/24 |
| 4,723,284 | 2/1988 | Muck et al. | 380/25 |
| 4,747,050 | 5/1988 | Brachtl et al. | 380/24 |
| 4,755,940 | 7/1988 | Brachtl et al. | 380/24 |
| 4,850,017 | 7/1989 | Matyas et al. | 380/21 |

OTHER PUBLICATIONS

"Some Techniques for Handling Encipherment Keys", R. W. Jones, ICL Tech. Journal (11/82) pp. 175–188.
"Security for Computer Networks", Davies et al., John Wiley & Sons, pp. 168–172.

Primary Examiner—Salvatore Cangialosi
Attorney, Agent, or Firm—John E. Hoel

[57] ABSTRACT

A method and apparatus are disclosed for use in a data processing system which executes a program which outputs cryptographic service requests for operations with cryptographic keys which are associated with control vectors defining the functions which each key is allowed by its originator to perform. The improved method and apparatus enable the use of control vectors having an arbitrary length. It includes a control vector register having an arbitrary length, for storing a control vector of arbitrary length associated with an N-bit cryptographic key. It further includes a control vector checking means having an input coupled to the control vector register, for checking that the control vector authorizes the cryptographic function which is requested by the cryptographic service request. It further includes a hash function generator having an input coupled to the control vector register and an N-bit output, for mapping the control vector output from the control vector register, into an N-bit hash value. A key register is included for storing the N-bit cryptographic key. It further includes a logic block having a first input coupled to the N-bit output of the hash function generator, and a second input connected to the key register, for forming at the output thereof a product of the N-bit key and the N-bit hash value. Finally, an encryption device is included having a first input for receiving a cleartext data stream and a key input coupled to the output of the logic block, for forming a ciphertext data stream at the output thereof from the cleartext data stream and the product. A decryption device can be substituted for the encryption device to perform decryption operations in a similar manner.

41 Claims, 19 Drawing Sheets

$eKKL+C\ (dKKR+C\ (eKKL+C\ (K)\ )\ )\ )=Y$ $e^*KK.Cinf(K) = eKKL+ML(dKKR+MR(eKKL+ML(K))) = Y$ (64 BITS)

FIG. 12

| MDC ALGORITHM USING 2 ENCRYPTION OPERATIONS PER BLOCK |
|---|
| 1. PAD THE INPUT TEXT WITH X 'FF' TO A MULTIPLE OF 8 BYTES.<br>2. PARTITION THE INPUT TEXT INTO $<n>$ 8 BYTE BLOCKS T8 $<1>$ TO T8 $<n>$<br>3. IF n = 1 THEN SET n = 2 AND T8 $<2>$ = 8 BYTES OF x '00'<br>4. SET INITIAL VALUES OF KD1 AND KD2 ( SEE BELOW )<br>5. FOR $<i>$ = 1, 2, ..., n:<br>    a. MDCOP (KD1, KD2, T8 $<i>$, T8 $<i>$ )<br>    b. KD1 := OUT1<br>    c. KD2 := OUT2<br>6. OUTPUT THE 16 BYTE MDC := ( KD1 $\|$ KD2 ). |

FIG. 13

| MDC ALGORITHM USING 4 ENCRYPTION OPERATIONS PER BLOCK |
|---|
| 1. PAD THE INPUT TEXT WITH X 'FF' TO A MULTIPLE OF 8 BYTES<br>2. PARTITION THE INPUT TEXT INTO $<n>$ 8 BYTE BLOCKS T8 $<1>$ TO T8 $<n>$.<br>3. IF n = 1 THEN SET n = 2 AND T8 $<2>$ = 8 BYTES OF x '00'.<br>4. SET INITIAL VALUES OF KD1 AND KD2 ( SEE BELOW ).<br>5. FOR $<i>$ = 1, 2, ..., n:<br>    a. MDCOP (KD1, KD2, T8 $<i>$, T8 $<i>$ )<br>    b. KD1int := OUT1<br>    c. KD2int := OUT2<br>    d. MDCOP (KD1int, KD2int, KD2, KD1 )<br>    e. KD1 := OUT1<br>    f. KD2 := OUT2<br>6. OUTPUT THE 16 BYTE MDC := ( KD1 $\|$ KD2 ). |

FIG. 14

| METHOD | QUANTITY EXCLUSIVE-ORED WITH KKL | QUANTITY EXCLUSIVE-ORED WITH KKR |
|---|---|---|
| 64 BIT CONTROL VECTOR | C: [ |00| ] BITS i, i+1 | C: [ |00| ] BITS i, i+1 |
| 128 BIT CONTROL VECTOR | CL: [ |00| ] BITS i, i+1 | CR: [ |01| ] BITS i, i+1 |
| ARBITRARY LENGTH CONTROL VECTOR | ML: [ |00| ] BITS i, i+1 | MR: [ |10| ] BITS i, i+1 |

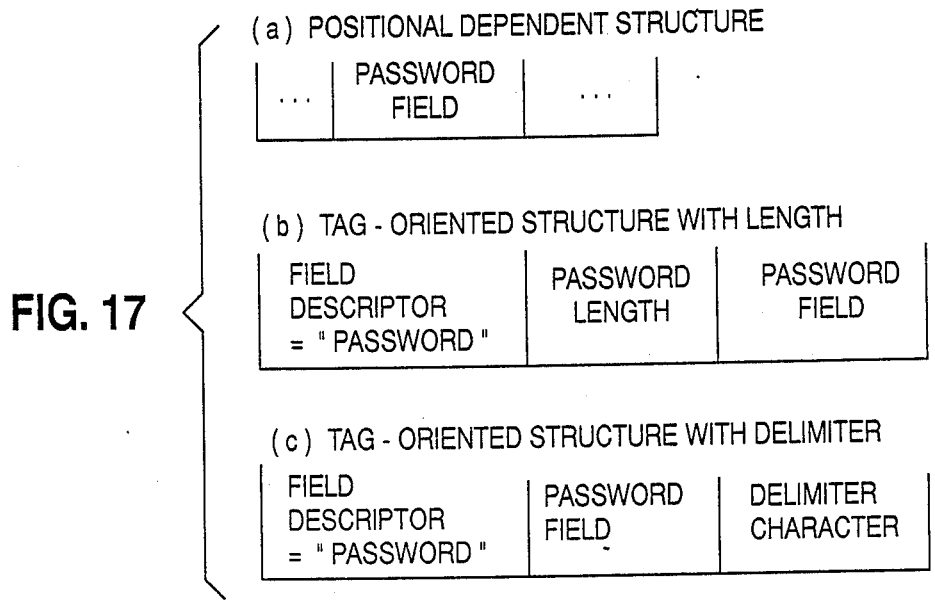

FIG. 17

(a) POSITIONAL DEPENDENT STRUCTURE

| ... | PASSWORD FIELD | ... |

(b) TAG - ORIENTED STRUCTURE WITH LENGTH

| FIELD DESCRIPTOR = "PASSWORD" | PASSWORD LENGTH | PASSWORD FIELD |

(c) TAG - ORIENTED STRUCTURE WITH DELIMITER

| FIELD DESCRIPTOR = "PASSWORD" | PASSWORD FIELD | DELIMITER CHARACTER |

FIG. 15
(a) POSITIONAL DEPENDENT BITS AND FIELDS
(b) TAG- ORIENTED FIELD WITH LENGTH FIELD
(c) TAG - ORIENTED FIELD WITH DELIMITER
(d) TAG - ORIENTED CONTROL VECTOR WITH LENGTH FIELDS
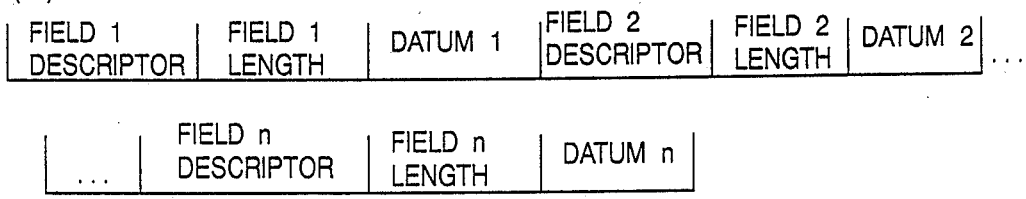
(e) TAG - ORIENTED CONTROL VECTOR WITH FIELD DELIMITERS
(f) MIXED FORMAT CONTROL VECTOR

FIG. 19

(a) ONE OR MORE START AND END DATE/TIMES

| ... | START DATE/ TIME 1 | END DATE/ TIME 1 | START DATE/ TIME 2 | END DATE/ TIME 2 | ... | START DATE/ TIME n | END DATE/ TIME n | ... |

(b) ASSOCIATING TIME INTERVALS TO INSTRUCTION

| ... | INST ID 1 | START DATE/ TIME 1 | END DATE/ TIME 1 | INST ID 2 | START DATE/ TIME 2 | END DATE/ TIME 2 | ... |

| ... | INST ID n | START DATE/ TIME n | END DATE/ TIME n | ... |

(c) ASSOCIATING TIME INTERVALS TO SYSTEM

| ... | SYSTEM ID 1 | START DATE/ TIME 1 | END DATE/ TIME 1 | SYSTEM ID 2 | START DATE/ TIME 2 | END DATE/ TIME 2 | ... |

| ... | SYSTEM ID n | START DATE/ TIME n | END DATE/ TIME n | ... |

# SECURE MANAGEMENT OF KEYS USING EXTENDED CONTROL VECTORS

BACKGROUND OF THE INVENTION

1. Technical Field

The invention disclosed broadly relates to data processing technology and more particularly relates to cryptographic applications in data processing.

2. Background Art

The following copending patent applications are related to this invention and are incorporated herein by reference:

B. Brachtl, et al., "Controlled Use of Cryptographic Keys Via Generating Stations Established Control Values," Ser. No. 55,502, filed March 1987, assigned to IBM Corporation, and incorporated herein by reference.

S. Matyas, et al., "Secure Management of Keys Using Control Vectors," filed August, 1988 (IBM docket number MA9-88-011), assigned to IBM Corporation, and incorporated herein by reference.

S. Matyas, et al., "Data Cryptography Operations Using Control Vectors," filed August, 1988 (IBM docket number MA9-88-012), assigned to IBM Corporation, and incorporated herein by reference.

S. Matyas, et al., "PIN Processing Using Control Vectors," filed August, 1988 (IBM docket number MA9-88-013), assigned to IBM Corporation, and incorporated herein by reference.

B. Brachtl, et al., "Data Authentication Using Modification Detection Codes Based on a Public One Way Encryption Function, filed Aug. 28, 1987, Ser. No. 90,633 assigned to IBM Corporation, and incorporated herein by reference.

The Control Vector Concept

The control vector is a compact data structure for defining the usage attributes of cryptographic keys and for controlling the distribution of cryptographic keys from one network device to another. The control vector is cryptographically coupled to the key via an encryption process such that the key can be decrypted properly only if the control vector is correctly specified to the cryptographic hardware.

FIG. 1 illustrates a system for cryptographically coupling a 64 bit control vector to a 128 bit cryptographic key, which is described in the above-referenced copending patent applications by Brachtl, et al. and Matyas, et al. Notationally, it is convenient to express encryption of plaintext X with key K as $eK(X)=Y$, where Y denotes the resulting ciphertext. The inverse process of decryption of ciphertext Y with key K to recover plaintext X is expressed as $dK(Y)=X$. The method of encrypting a 64 bit key K with a 128 bit key encrypting key KK (consisting of a left-hand 64 bit portion of the key designated KKL and a right-hand 64 bit portion of the key designated KKR) and a 64 bit control vector C in register 40' is a variation on the method of multiple encryption described in the above-referenced copending patent application by Matyas, et al; "Secure Management of Keys Using Control Vectors", and is expressed as eKKL+C(dKKR+C(eKKL+C(K))) where "+" denotes an exclusive-OR function. Thus, encryption consists of first exclusive-ORing in exclusive-OR device 46 the 64 bit control vector C to KKL and KKR in register 42 and then alternately encrypting K in register 44 with KKL+C in encryption device 41, decrypting the result with KKR+C in decrypting device 43, and encrypting that result with KKL+C in encrypting device 45. Instead of writing the cumbersome form eKKL+C(dKKR+C(eKKL+C(K))), a shorthand notation is used instead. The notation KK.C is used to express the exclusive-OR operation i.e., that C is exclusive-ORed with KK, or more precisely, that C is exclusive-ORed with KKL and KKR, respectively. The notation *KK is used in lieu of KK to indicate that KK is a 128 bit key instead of a 64 bit key, i.e., *KK denotes a 128 bit key whereas KK without the asterisk denotes a 64 bit key. Used together, e*KK.C(K) denotes encryption of K with a 128 bit KK where C is previously exclusive-ORed with each half of KK.

FIG. 2 illustrates the system for decrypting the encrypted value of K (i.e. Y=e*KK.C(K)) using key KK and control vector C. This process consists of first exclusive-ORing C with KKL and KKR, as before, and then alternately decrypting the encrypted value of K with KKL+C in decryption device 47, encrypting the result with KKR+C in encryption device 48, and decrypting that result with KKL+C in decryption device 49. It will be appreciated from a reading of FIG. 2 that K is properly recovered when KK,C and eKKL+C(dKKR+C(eKKL+C(K))) are correctly specified, but that an unpredictable, and effectively random value is produced if even so much as one bit in C is incorrectly specified. (Precisely speaking, if C' is an arbitrary control vector not equal to C and ciphertext eKKL+C(dKKR+C(eKKL+C(K))) is decrypted with KK and C', the probability of accidentally recovering a plaintext equal to K is about $\frac{1}{2}**64$, which is of no cryptographic consequence. An adversary would have as good a chance to discover the clear value of K through cryptoanalysis using a straightforward method of direct search, i.e., given a plaintext and corresponding ciphertext encrypted with K, decrypt the ciphertext with every possible key until one is found that produces the given plaintext. A comparable number of encryption/decryption steps is required in both cases.)

The data encryption algorithm (DEA), as described in ANSI X3.92-1981 is one example of an encryption algorithm that can operate with control vectors using the methods of encryption and decryption described in FIG. 1 and FIG. 2. The reader will appreciate that the control vector concept can be adapted to any symmetric block cipher by specifying the control vector length to be equal to the key length, or to a multiple of it when multiple encipherment techniques are employed.

Network Configuration of Cryptographic Devices

FIG. 3 illustrates a network of connected cryptographic devices (hosts, controllers, workstations, etc.), consisting of a first cryptographic device 100 in a data processing system 2, connected to several other cryptographic devices 200, 300, etc. via a cryptographic distribution channel 1000, and which are capable of communicating cryptographically. That is, the devices can communicate privately by encrypting data at a sending device and decrypting data at a receiving device. The devices can authenticate data transmissions by generating and attaching a message authentication code to a message prepared at a sending device and authenticate the message and message authentication code at a receiving device. And the devices can generate keys securely within a cryptographic device at a generating device, encrypt the keys, and transmit the encrypted keys to a receiving device where they are received and stored in an appropriate form in the key data set belonging to the receiving device for subsequent use in encrypting and authenticating data, or for some other key management function. These and more key management procedures, protocols and methods are described in greater detail in copending patent applications by Matyas, et al. cited above as IBM dockets MA9-88-011, MA9-88-012 and MA9-88-013.

Referring now to FIG. 4, which is an enlargement of cryptographic device 100 shown in FIG. 3, each cryptographic device contains a cryptographic facility (CF) 4 capable of executing a set of cryptographic instructions 52, a key storage 22, a cryptographic facility access program (CFAP) 54, and user application programs 55. The CF contains a register 18 for the storage of a 128 bit master key KM consisting of a left-hand 64 bit portion, denoted KML, and a right-hand 64 bit portion, denoted KMR. (It is assumed that the cryptographic algorithm implemented within the CF is the data encryption algorithm (DEA).) All keys stored outside the CF are encrypted under the master key and a control vector, as described in FIG. 1, and are stored in key storage 22. Keys in key storage 22, i.e., encrypted under the master key are in a form that can be processed by the CF, and therefore are called operational keys. Keys encrypted under other keys (called key encrypting keys, KEKs) are in a form suitable for distribution from one device to another, i.e., the keys are stored in a form suitable for export to another device or for import from another device. (Note: keys are sometimes generated and enciphered in an import form so they can be re-imported at the same device where they are generated.) Typically, each pair of devices share two KEKs: (a) a first KEK (denoted KEK1) used to encrypt and transmit keys from a first device to a second device, and (b) a second KEK (denoted KEK2) used to encrypt and transmit keys from the second device to the first device. At the first device, KEK1 is designated via its control vector as a KEK sender key since it is capable of encrypting keys for export to the second device, whereas KEK2 is designated via its control vector as a KEK receiver key since it is capable of decrypting keys for import from the second device. At the second device, KEK1 and KEK2 are designated oppositely, i.e., KEK1 is a KEK receiver and KEK2 is a KEK sender key. The cryptographic facility 4 also contains a random number generator 26 capable of generating 64 bit random numbers. The output of the random number generator can be read only by the CF. The cryptographic facility also contains a secure front panel interface 58 with a port 59 for attachment of a hand-held key entry device 60. The front panel also has a physical key-activated switch 61 for enabling entry of keys, including the master key, via key entry device 60. (The above-referenced copending patent application (IBM Docket MA9-88-011) by S. Matyas, et al., "Secure Management of Keys Using Control Vectors," provides a more detailed description of the cryptographic components comprising cryptographic device 100.)

Referring again to FIG. 4, instruction set 52 consists of several cryptographic instructions capable of supporting key management, data encryption and authentication functions, and processing of financial transactions based on authentication of personal identification numbers (PINs). Copending patent applications by S. Matyas, et al., (MA9-88-011) "Secure Management of Keys Using Control Vectors", (MA9-88-012) "Data Cryptography Operations Using Control Vectors", and MA9-88-013) "PIN Processing Using Control Vectors," referenced above, provide a more detailed description of the three cited applications of cryptography. Typically, a request for cryptographic service originates with an application program 55. The steps necessary to satisfy the request can be traced. For example, a request can take the form of a macro call to CFAP at 62 in which one or more parameters are passed (e.g., clear and encrypted data, keys and cryptovariables, key labels used in accessing encrypted keys in key storage 22 at 65) and thereby enabling CFAP 54 to carry out the requested function. In turn, CFAP may call for CF 4 to execute one or more cryptographic instructions at 64, as necessary, in order to generate new cryptographic keys and cryptovariables, or to encipher, decipher, or re-encipher data or keys thereby producing the outputs in the appropriate encrypted or decrypted form. As a result, CFAP may store newly generated encrypted keys in key storage 22 at 65, it may return one or more values to the requesting application program at 66, or both. Condition codes from the CF to CFAP at 64 and from CFAP to the application program at 66 indicate normal or abnormal status including indications when a requested operation could and could not be performed.

Control Vectors Used for Management of Operational Keys

Since the attributes of a key are typically public, not private, i.e., are either known or can be inferred by system users, the control vector is defined as a public or nonsecret value. On the other hand, since the cryptographic keys defined to the system must be kept secret, the process of "linking" the control vector to a key must not expose the key. (Note: One aspect of the invention involves a technique for incorporating a secret password into the control vector.)

FIG. 5 illustrates linking a control vector to a key. The example given is the use of the key generate instruction KGEN, which causes a key to be generated by the cryptographic facility. The steps can be traced. In step 71, the application A calls CFAP to generate a key. Prior to issuing the KGEN instruction, CFAP builds a 64 bit control vector in step 72 specifying the attributes of the desired key to be generated. Control vector C is passed to the CF at step 73 as part of the KGEN instruction. In response, the CF generates (using a random number generator whose output can be read only by the CF) a 64 bit random number at step 75, which is adjusted for odd parity. This represents the generated key K. K is encrypted using the exclusive-OR product of the control vector C passed at 73 and master key KM accessed at 74 as indicated by the encryption rule described in FIG. 1. The encrypted key, denoted e*KM.C(K), is returned to CFAP at step 76. (Note that e*KM.C(K) is a shorthand notation for expressing multiple encryption under the variant keys KML+C and KMR+C, respectively.) In turn, CFAP may store the encrypted key e*KM.C(K) and control vector C output at 77, in the key storage 22 at step 78 (in which case a key label is returned in step 79 to the application program at step 80) or the values may be returned to a requesting application program at step 80. In any event, the reader will appreciate that the process of key generation and "linking" the control vector to the generated key via encryption is one that does not expose the generated key in cleartext form outside the cryptographic facility, whereas the control vector is maintained as a public or nonsecret value.

Although the control vector is not a secret quantity, it is necessary that it be supplied, specified, or provided as an input to the cryptographic facility anytime the key to which it is linked is to be used. Every bit in the control vector must be specified, exactly as it was specified originally when the key was generated and encrypted. Failure to specify C correctly will result in the recovery of a random, unknown key value. The recovery of a key (i.e., decryption of a key) which has been previously encrypted using a control vector, is always part of a larger process in which the encrypted key and control vector are passed as parameters of a cryptographic instruction invoked via the CFAP to CF interface. In this way, the cryptographic facility can check the control vector to ensure that the key is permitted to be used as an input parameter to the requested cryptographic instruction. This preliminary checking of the control vector is called CV checking. When more than one encrypted key and control vector are supplied as parameters to a cryptographic instruction, CV checking not only consists of checking with control vector for consistency, but cross checking values in one control vector against values in another control may be required. The steps required by the cryptographic facility to process a cryptographic instruction are traced in FIG. 6. Basically, every instruction consists of three functions: (a) CV checking 81, (b) key recovery 82, and (c) processing the requested instruction 83. The first functional requirement is CV checking 81, which consists of checking the control vectors for consistency and to determine whether the requested usage of the key parameters is consistent with the requested instruction. If CV checking fails, the instruction execution is aborted. In all cases, a condition code is turned to CFAP indicating status information. If CV checking succeeds, the process continues. The second functional requirement is key recovery 82, i.e., decryption of encrypted keys. The method of cryptographic coupling between the control vector and the key is such that any cheating (i.e., changing bits in the control vector to give the key incorrect attributes) will result in the recovery of a random, unpredictable value for the key. In effect, the desired, needed cryptographic key is not recovered by the cryptographic instruction. The third functional requirement is that of processing the requested cryptographic instruction 83. If the control vectors and keys have been correctly specified, the instruction is processed correctly. However, if cheating occurs, the instructions are designed so that the instruction outputs are of no beneficial value. Copending patent application (IBM Docket MA9-88-011) by S. Matyas, et al., "Secure Management of Keys Using Control Vectors," referenced above provides a more detailed description of the processes of CV checking, key recovery, and instruction execution.

The degree of key management control offered by the control vector is related to and depends largely on the number of bits that are available in the control vector. An especially short control vector, say from 10 to 50 bits, would have a very limited use and could support only a limited number of key management separations, usages, and controlling mechanisms. Copending patent applications by Matyas, et al., "Secure Management of Keys Using Control Vectors," Data Cryptography Operations Using Control Vectors," and "PIN Processing Using Control Vectors," as referenced above, which make use of a 64 bit control vector, effectively demonstrate that a 64 bit control vector may be used advantageously to control key usage and key export, as well as distinguish among several control vector types, for a moderately complex cryptographic system. Thus, a 64 bit control vector will suffice for many cryptographic systems' implementations. However, more sophisticated key management controls are envisioned, which will require control vectors in excess of 64 bits.

OBJECTS OF THE INVENTION

It is an object of the invention to provide an improved method for the management of cryptographic keys.

It is another object of the invention to provide an improved method for the management of cryptographic keys which is more flexible than methods described by prior art and which has equivalent or improved cryptographic security.

It is another object of the invention to provide an improved method for the management of cryptographic keys that permits new and improved cryptographic services to be offered to cryptographic system users.

It is another object of the invention to extend the length of a control vector while minimizing the additional encryptions/decryptions required to process the control vector.

It is another object of the invention to extend the length of a control vector while keeping the process of key recovery transparent to the cryptographic hardware.

It is another object of the invention to provide two methods for implementing control vectors of arbitrary length: (a) the first is a positional definition, where bits in the control vector are defined according to their relative positional locations within the control vector (b) the second is tag definition, where bits in the control vector are defined according to the field tag definitions that precede them.

It is another object of the invention to provide strong cryptographic separation between three control vector types, viz., single length control vectors, double length control vectors, and arbitrary length control vectors, such that a control vector of one type cannot cross over and be interpreted as a valid control vector of another type.

It is another object of the invention to provide an improved method of key management which permits the generator or creator of a key to prescribe specific intervals of time when the key is enabled for usage, whereas at all other times the key cannot be used.

It is another object of the invention to provide an improved method of key management which permits the usage of a key to be linked to a password which must be correctly specified prior to usage of the key, such that the key can be used only if the password is correctly specified.

SUMMARY OF THE INVENTION

The present invention shows firstly how the 64 bit control vector can be conveniently extended to a 128 bit control vector. The method consists of exclusive-ORing the left-hand 64 bits of C with the left-hand 64 bits of KK and exclusive-ORing the right-hand 64 bits of C with the right-hand 64 bits of KK. Otherwise, the 128 bit control vector is conceptually the same as the 64 bit control vector. However, the 128 bit control vector offers an additional 64 bits for key management control, effectively doubling the control vector length, but does so without additional encryption/decryption steps. In effect, a 128 bit control vector is obtained with no additional computational overhead. The method is such that the 64 bit control vector definition is just a subcase of the 128 bit control vector.

The present invention shows secondly how the 64 bit control vector can be extended to a control vector of arbitrary length. However, from two to four extra encryption operations are required for each 64 bit block in the control vector. Thus, the additional processing overhead increases linearly with control vector length. Basically, a control vector of arbitrary length is first operated on using a hashing function which maps a control vector C having many bits Nx into a hash value C' having fewer bits N, where Nx is greater than N. (In the examples herein, N=128.) A particularly useful hashing function is a nonsecret one-way function, such as a modification detection code (MDC) algorithm described in copending patent application by Brachtl, et al., "Data Authentication Using Modification Detection Codes Based on a Public One-Way Encryption Function," referenced above, to calculate a 128 bit hashed, one-way function of the control vector. This 128 bit result is then combined with KK to produce two variant keys of KKL and KKR in exactly the same manner in which a 128 bit control vector is combined with KK. More precisely, if M denotes the 128 bit MDC calculated on the control vector, then the left-hand 64 bits of M are exclusive-ORed with the left-hand part of KK and the right-hand 64 bits of M are exclusive-ORed with the right-hand part of KK. Otherwise, the arbitrary length control vector is conceptually the same as the 128 bit control vector.

Let C denote a control vector of arbitrary length. The invention describes two possible architectural specifications for C. Firstly, C will admit a specification where the field information in C is positional (i.e., it depends on its position relative to a left- or right-hand origin point). Secondly, C will admit a tag-oriented specification wherein the fields in C consist of a tag and a datum. In such a specification, the fields are not positional, but can occur in any order. Moreover, only those fields required for managing and controlling a key need to be specified in the control vector. Mixtures of positional and tag-oriented specifications are possible, and are embraced by the present definition of the arbitrary length control vector.

Control vector checking for a 128 bit control vector is exactly the same as control vector checking for a 64 bit control vector, except that the checking can involve any of the 128 bits whereas the latter case involves at most 64 bits. Control vector checking for a control vector of arbitrary length is similar. That is, checking is based on the control vector as always, except now a very long control vector is present, and many more control vector bits and fields may need to be tested. Control vector checking is not performed on the 128 bit hashed, one-way function of the control vector. This hashed value is calculated internal to the CF only, not appearing or needing to appear outside the CF for any cryptographic purpose, as part of the key recovery process. (Although there is no loss in security if the hash value is known outside the CF, since the control vector and the hashing function are ordinarily publicly available and known.)

The arbitrary length CV, like the 128 bit CV, provides additional space to define or extend key usage and control parameters. In particular the arbitrary length CV more readily supports tag-oriented specifications, since the length of such specifications are themselves, arbitrary. More specifically, the invention describes a means in which the arbitrary length CV may support a list of dates and times during which the associated key may be used. The invention also describes a means for incorporating a secret password into the control vector, such that the key can be used only if the correct password is first specified.

BRIEF DESCRIPTION OF THE DRAWINGS

These and other features and advantages of the invention will be more fully appreciated with reference to the accompanying figures.

FIG. 12 describes the 2-encryptions per block modification detection code (MDC) algorithm.

FIG. 13 describes the 4-encryptions per block modification detection code (MDC0 algorithm.

FIG. 14 illustrates a method to cryptographically separate the three CV methods: 64 bit CV, 128 bit CV, and arbitrary length CV. The control vector quantities to be exclusive-ORed with the key encrypting key KKL,KKR are identified for each method. A fixed bit field within these quantities is defined along with the unique encodings used to separate the three methods.

FIG. 15, parts (a) through (f), describe data structure for control ventors of arbitrary length.

FIG. 17 illustrates several ways in which passwords may be incorporated into the control vector data structure.

FIG. 19 illustrates several ways in which time information may be incorporated into the control vector data structure.

DESCRIPTION OF THE BEST MODE FOR CARRYING OUT THE INVENTION

Double Length Control Vectors

Figure 7:
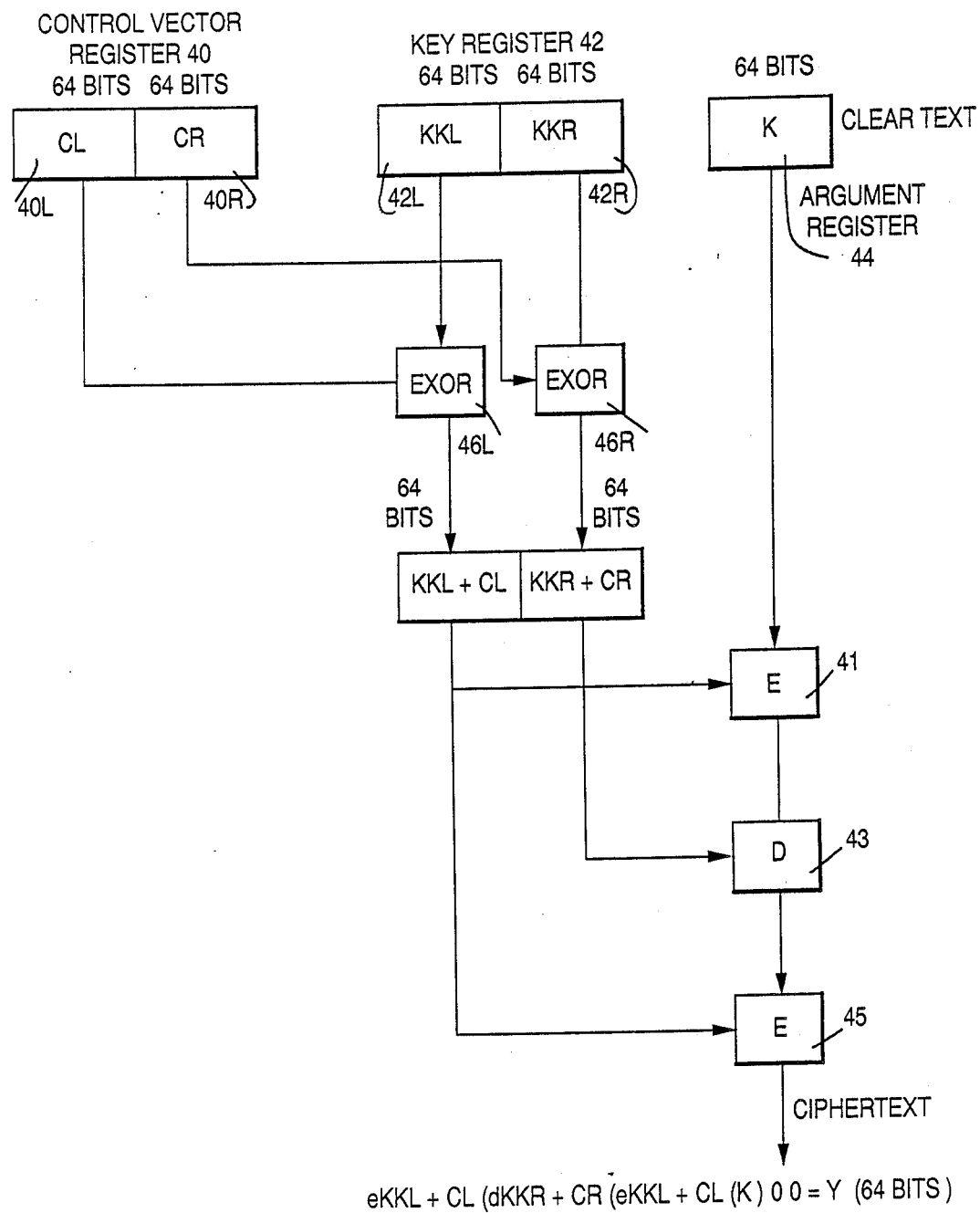
FIG. 7 is a block diagram description of a first embodiment of the invention, showing the system for encrypting a 64 bit cryptographic key with a 128 bit key encrypting key KK (consisting of a left-hand 64 bit portion of the key denoted KKL and a right-hand 64 bit portion of the key denoted KKR) and a 128 bit control vector C (consisting of a left-hand 64 bit portion denoted CL and a right-hand 64 bit portion denoted CR).
Figure 8:
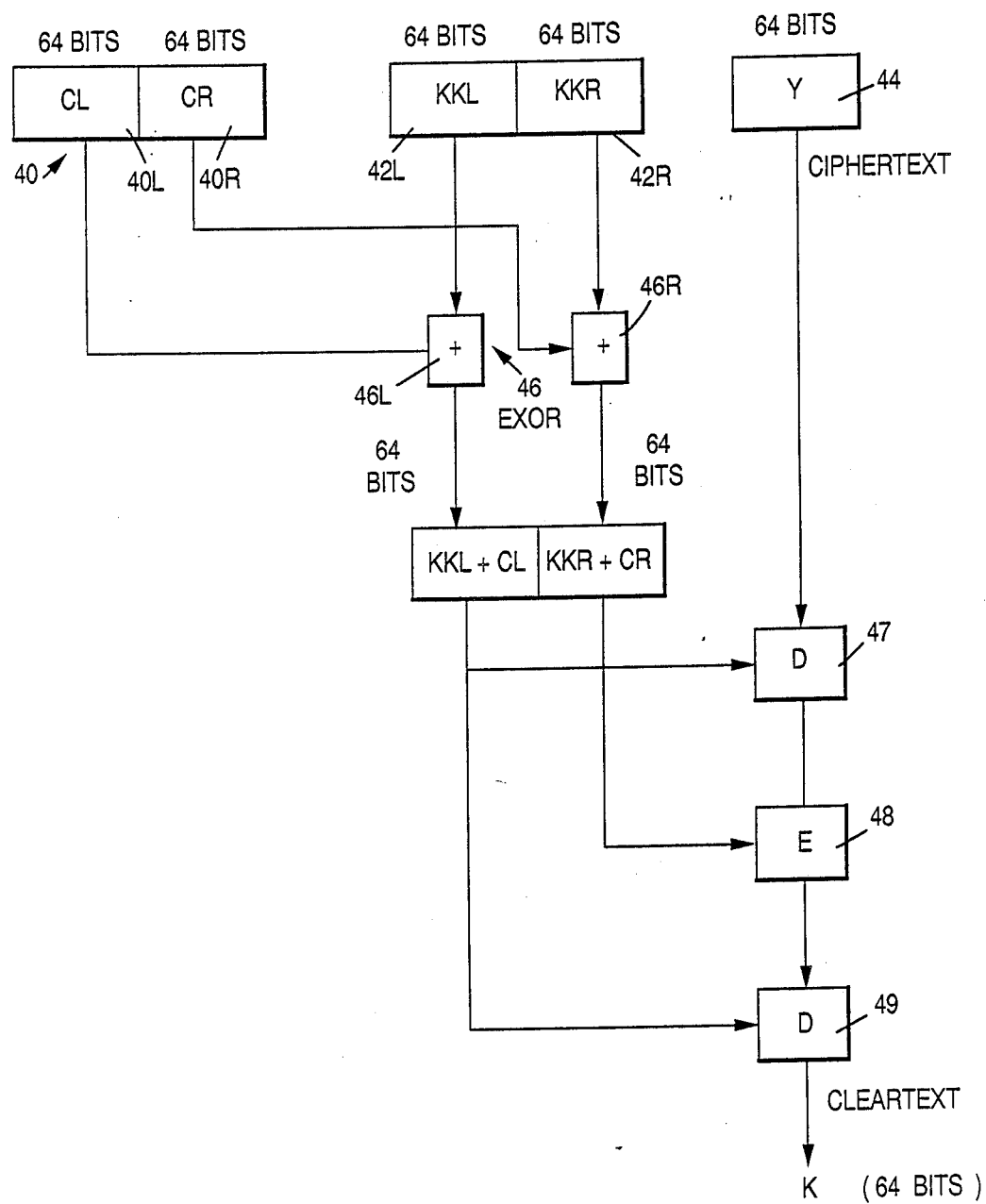
FIG. 8 is a block diagram description of the first embodiment of the invention, showing the system for decrypting a 64 bit cryptographic key K (previously encrypted using the method of FIG. 7, i.e. using a 128 bit control vector and 128 bit key encrypting key).

In the first embodiment of the invention shown in FIGS. 7 and 8, the 64 bit control vector can be advantageously extended to a 128 bit control vector. The additional 64 bits given by the 128 bit control vector thus provide the cryptographic system and cryptographic system user with a means to better control cryptographic key usage.

The system of FIG. 7 differs from the system of FIG. 1 as follows. With the system of FIG. 7, CL in register 40L is exclusive-ORed in exclusive-OR 46L with KKL in register 42L to form KKL+CL and CR in register 40R is exclusive-ORed in exclusive-OR 46L with KKR in register 42R to form KKR+CR. With the system of FIG. 1, C is exclusive-ORed with KKL and KKR to form KKL+C and KKR+C, respectively. Thus, with the system of FIG. 1, the same 64 bit control vector is exclusive-ORed with both parts of KK, whereas with the system of FIG. 7, different 64 bit control vectors are exclusive-ORed with each part of KK. Otherwise, the system of FIG. 1 and FIG. 7 are the same.

Figure 1:
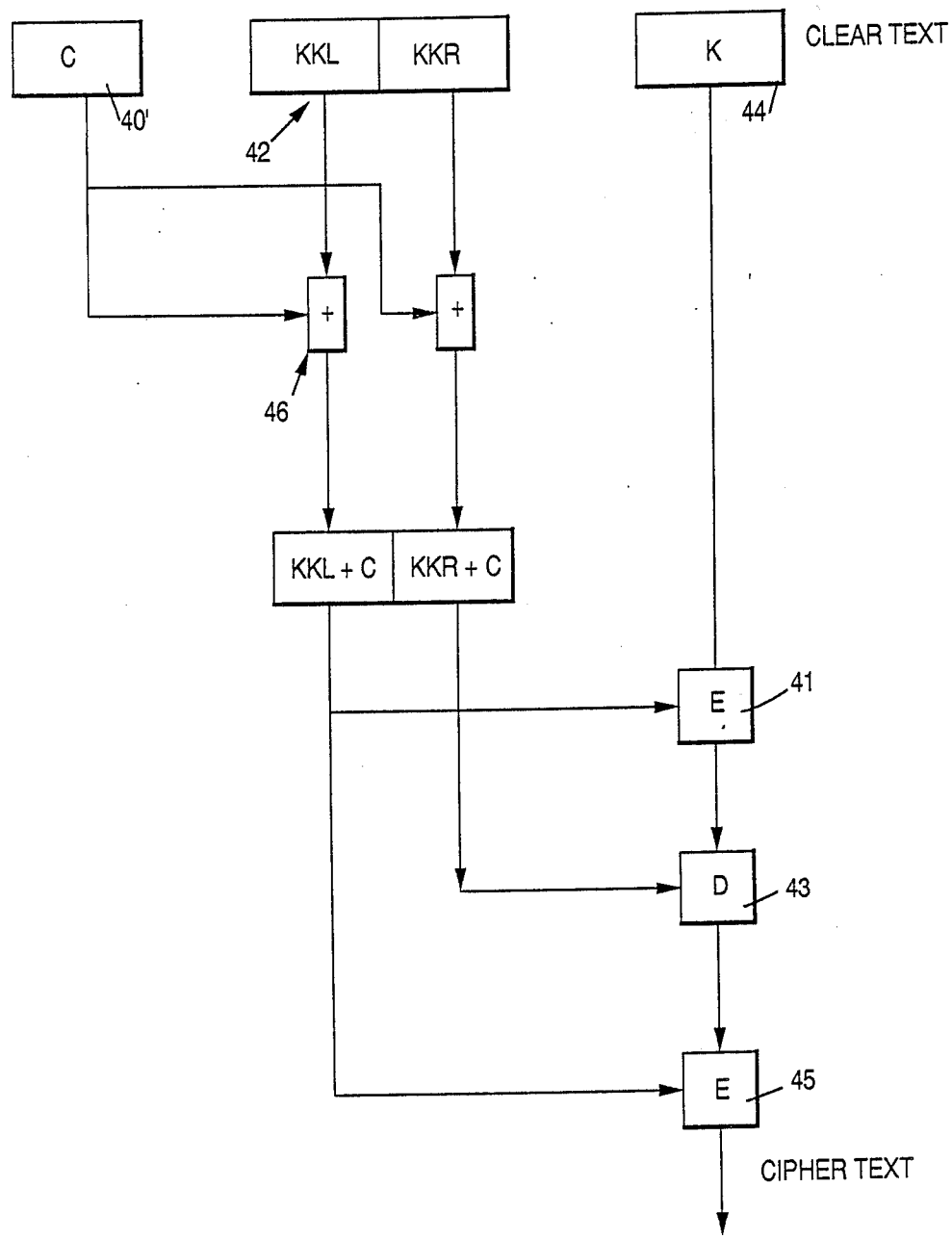
FIG. 1 is a block diagram description of the system for encrypting a 64 bit cryptographic key K with a 128 bit key encrypting key KK (consisting of a left-hand 64 bit portion of the key designated KKL and a right-hand 64 bit portion of the key designated KKR) and a 64 bit control vector C.

For convenience, the notation e*KK.C64(K) distinguishes the case where a 64 bit control vector is used with KK to encrypt K in FIG. 1 and the notation e*KK.C128(K) distinguishes the case where a 128 bit control vector is used with KK to encrypt K in FIG. 7. The output value Y in FIG. 1 is an example where Y can be expressed as Y=e*KK.C64(K). Likewise, the output value Y in FIG. 7 is an example where Y can be expressed as Y=e*KK.C128(K).

The system of FIG. 8 differs from the system of FIG. 2 as follows. With the system of FIG. 8, CL in register 40L is exclusive-ORed in exclusive-OR 46L with KKL in register 42L to form KKL+CL and CR in register 40R is exclusive-ORed in exclusive-OR 46R with KKR in register 42R to form KKR+CR. With the system of FIG. 2, C is exclusive-ORed with KKL and KKR to form KKL+C and KKR+C, respectively. Thus, the difference between FIG. 2 and FIG. 8 is that different 64 bit control vectors are exclusive-ORed with each part of KK.

Figure 2:
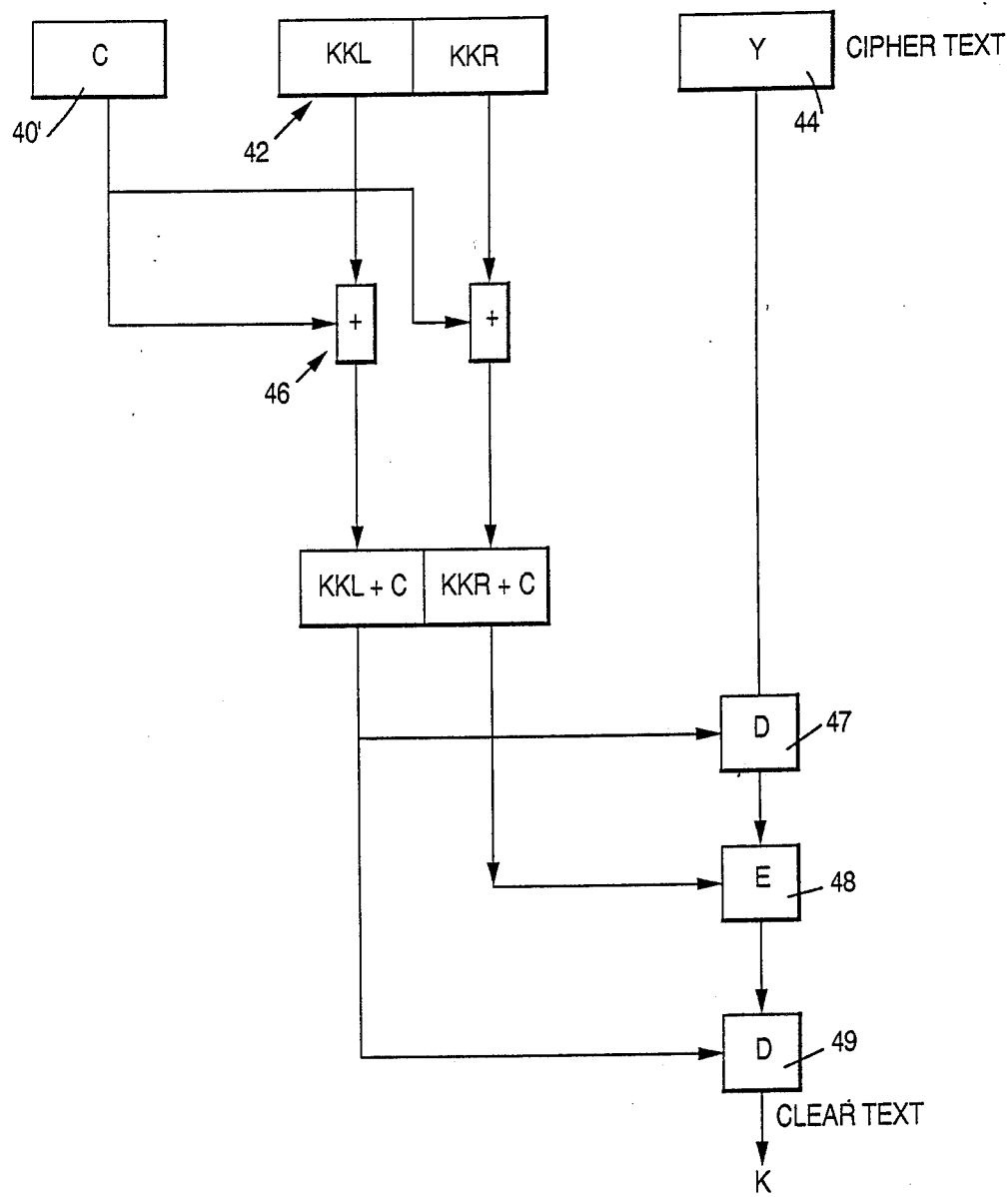
FIG. 2 is a block diagram description of the system for decrypting a 64 bit cryptographic key K (previously encrypted using the method of FIG. 1) with a 128 bit key encrypting key KK and a 64 bit control vector C.
Figure 3:
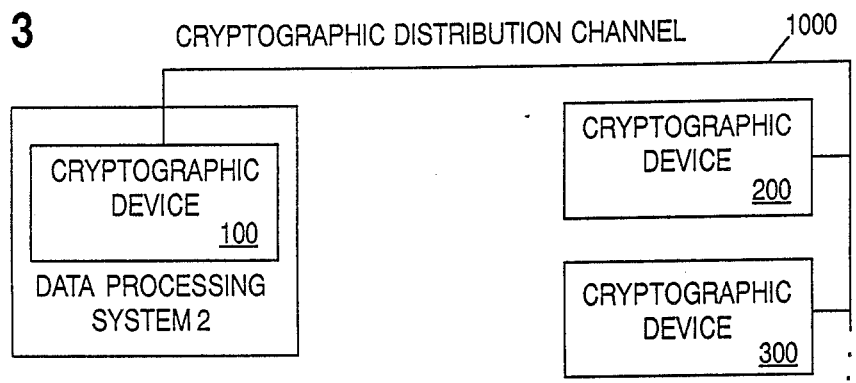
FIG. 3 is a block diagram illustrating a network of cryptographic devices connected via a cryptographic distribution channel.
Figure 4:
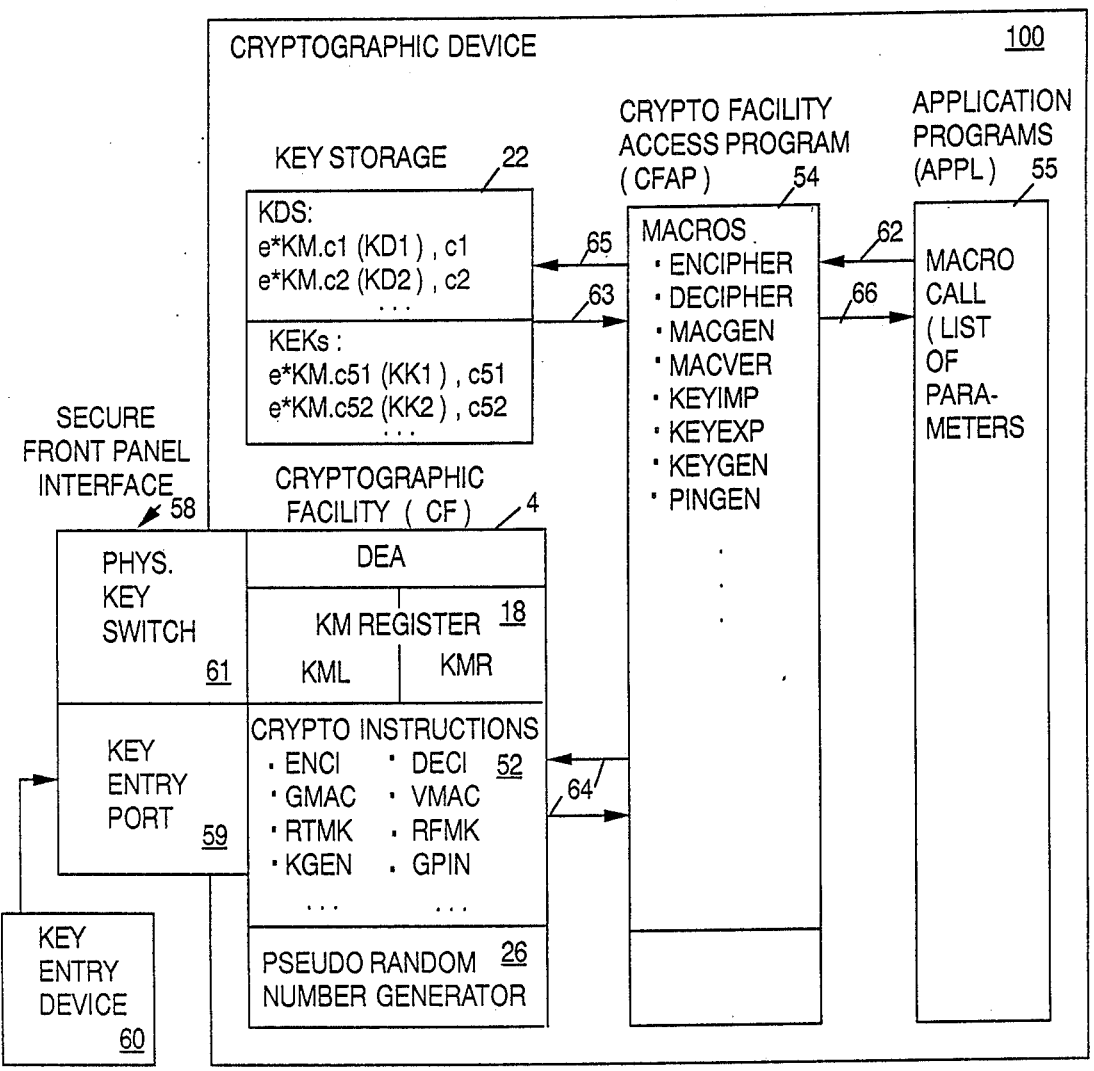
FIG. 4 is a block diagram describing the basic components within a cryptographic device.
Figure 5:
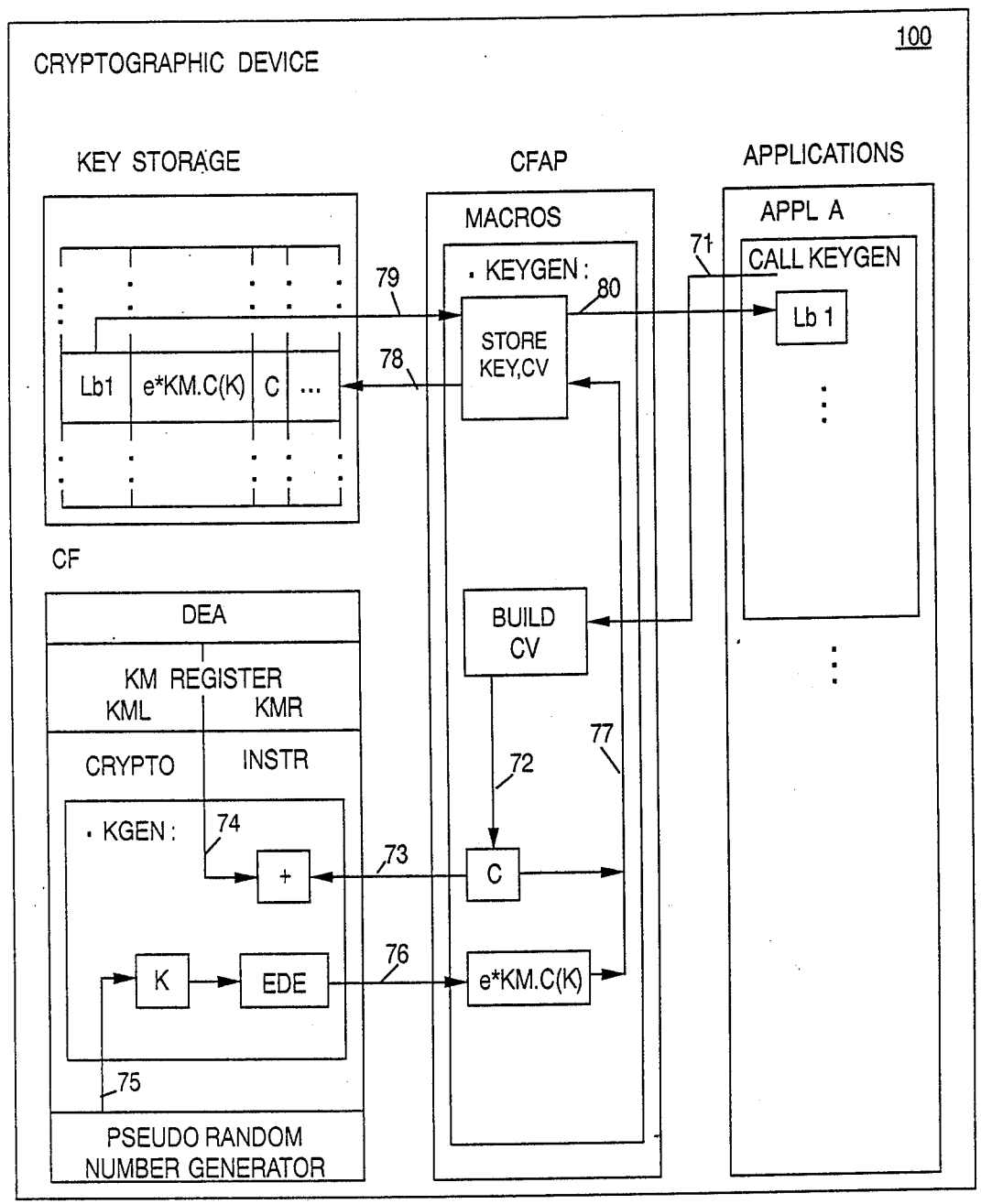
FIG. 5 is a block diagram illustrating a sequence of processes within the components of a cryptographic device to generate a key K in operational form. K is encrypted using the master key KM and control vector C, and is stored in key storage. The application may access the operational key K via an index, or label, associated with the key in storage.

The reader will appreciate that the system of FIG. 1 and FIG. 2 is just the system of FIG. 7 and FIG. 8 where C =CL =CR. In other words, the method of employing a 128 bit control vector reduces to that of employing a 64 bit control vector provided that the left-hand 64 bit portion of C equals to the right-hand portion of C. Thus, a 64 bit control vector is just a degenerate case of a 128 portion of C. Thus, a 64 bit control vector is just a degenerate case of a 128 bit control vector. The advantage of the system of FIG. 7 and FIG. 8 is that the control vector length is doubled without any additional computational or processing overhead. In fact, the definitions for a 64 bit control vector (FIG. 1 and FIG. 2) and a 128 bit control vector (FIG. 7 and FIG. 8) have architectural and implementation advantages. Existing cryptographic hardware and software implementing 64 bit control vectors can be easily extended to support 128 bit control vectors, since both systems are implemented using a triple encryption operation involving variant keys derived from KKL and KKR. Otherwise, the encryption processes are exactly the same. New cryptographic hardware and software implementing 128 bit control vectors can easily support 64 bit control vectors by merely setting CL =CR at the software level. In effect, both 64 and 128 bit control vectors can be made transparent to the cryptographic hardware.

Arbitrary Length Control Vectors

Figure 9:
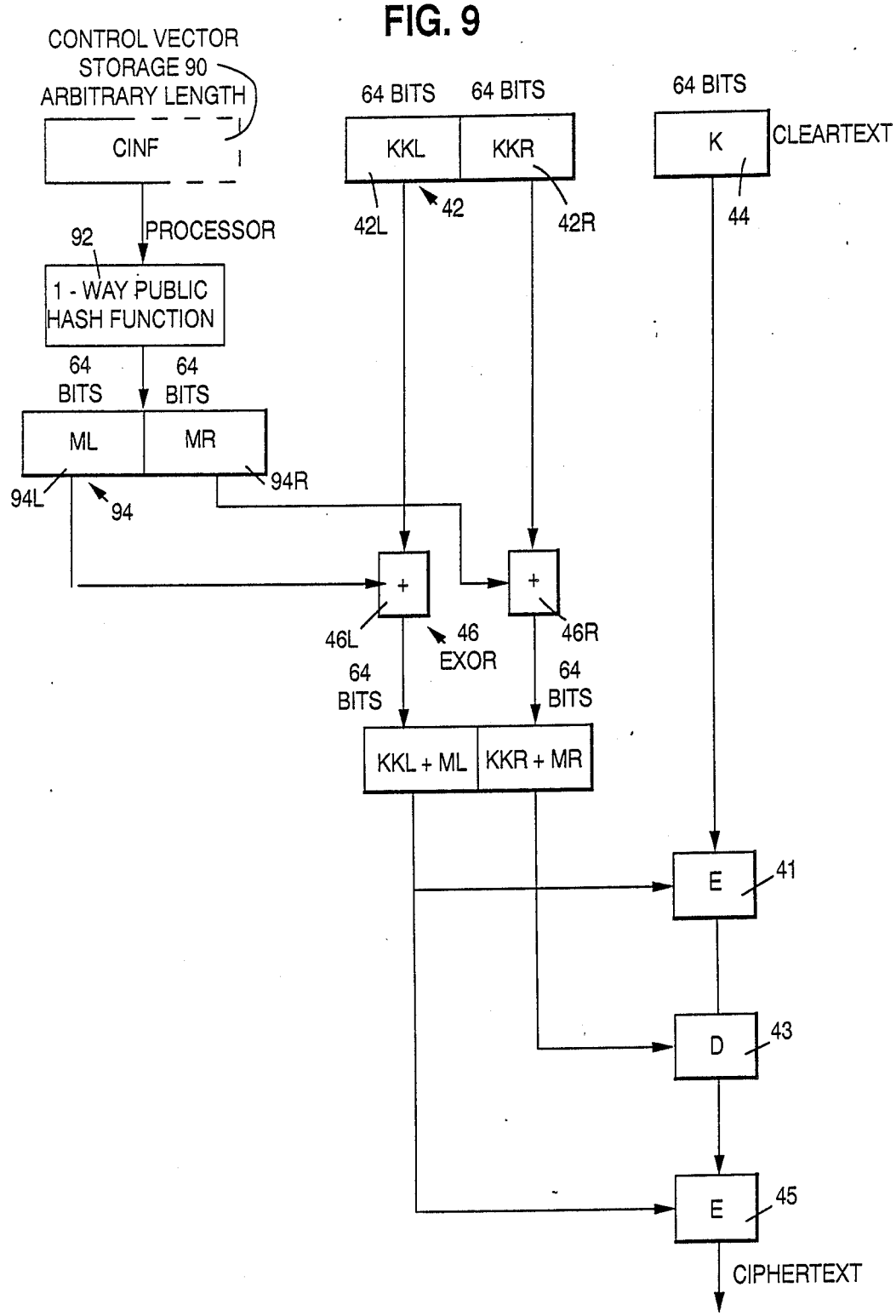
FIG. 9 is a block diagram description of a second embodiment of the invention, showing the system for encrypting a 64 bit cryptographic key K with a 128 bit key encrypting key KK (consisting of a left-hand 64 bit portion of the key denoted KKL and a right-hand 64 bit portion of the key denoted KKR) and an arbitrary control vector Cinf.
Figure 10:
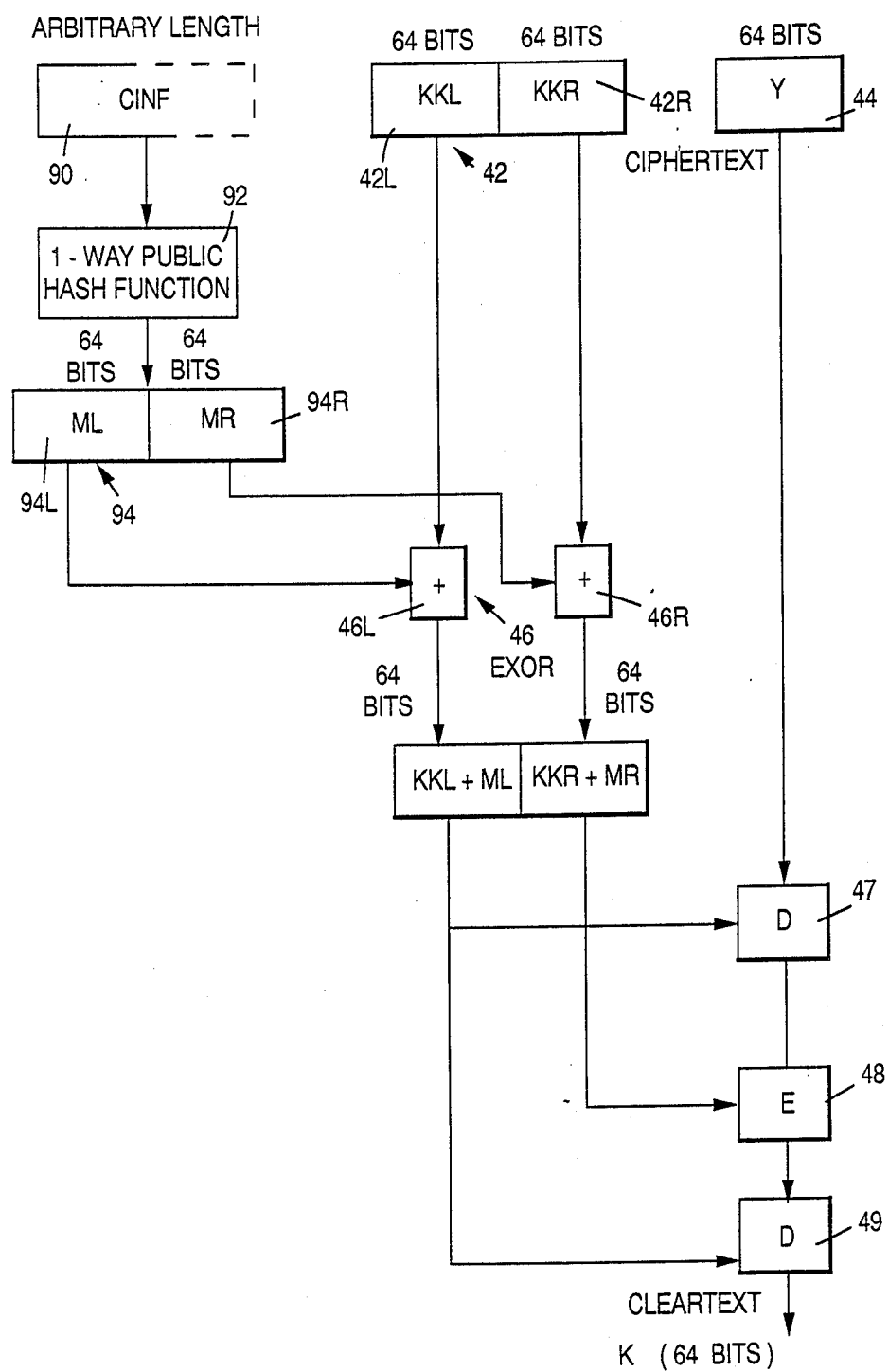
FIG. 10 is a block diagram of the second embodiment of the invention, showing the system for decrypting a 64 bit cryptographic key K (previously encrypted using the method of FIG. 9, i.e. using an arbitrary length control vector and 128 bit key encrypting key).

In the second embodiment of the invention shown in FIGS. 9 and 10, the 64 bit control vector can be advantageously extended to a control vector of arbitrary length. The unlimited number of bits provided by this system offers the maximum degree of cryptographic key management control possible.

FIG. 9 illustrates the system for encrypting a 64 bit cryptographic key K in register 44 with a 128 bit key encrypting key KK which is KKL concatenated with KKR (KK=KKL//KKR) in register 42 and a control vector C of arbitrary, or infinite, length (denoted Cinf) in register 90. The operation consists of first calculating a one-way public hash function on Cinf in hash function processor 92 to produce a 128 bit hash value result consisting of a left-hand 64 bit part denoted ML loaded into register 94L and a right-hand 64 bit part denoted MR loaded into register 94R. The one-way function computed in processor 92 has the property that it is computationally infeasible to calculate the input to the function from the function's output, but it is easy to calculate an output from an input. One-way functions are well-known and have been described in prior art. The definition of a strong one-way function is given below, from W. Diffie, et al. entitled "New Directions in Cryptography," IEEE Transactions on Information Theory, IT-22, No. 6, pp. 644–654 (1976).

A function f is a one-way function if, for any argument x in the domain of f, it is easy to compute the corresponding value y=f(x); yet for almost all y in the range of f, it is computationally infeasible, given a value of y and knowledge of f, to calculate any x whatsoever with the property that $f(x) = y$. It is important to note that a function is defined which is not invertible from a computational point of view, but whose noninvertibility is entirely different from that normally encountered in mathematics. A function f is normally called "noninvertible" when the inverse of a point y is not unique; i.e., there exist distinct points x1 and x2 such that $f(x1) = y = f(x2)$. This is not the sort of inversion difficulty that is required here. Rather, it must be overwhelmingly difficult, given a value y and knowledge of f, to calculate any x whatsoever with the property that $f(x) = y$.

The algorithm for calculating a modification detection code (see FIG. 11, FIG. 12, and FIG. 13), described below, provides an even stronger definition of a one-way function. The MDC algorithm is such that it is computationally infeasible to find an x1 and x2 such that $f(x1) = f(x2)$. In order to satisfy this stronger requirement, it is necessary for the MDC to be at least 128 bits in length. Otherwise, birthday-type attacks can be employed to find an x1 and x2 such that $f(x1) = f(x2)$.

Continuing with the system of FIG. 9, the operation next consists of exclusive-ORing with exclusive-OR 46L the 64 bit value ML in register 94L with the 64 bit key KKL in register 42L and exclusive-ORing with exclusive-OR 46R the 64 bit value MR in register 94R with the 64 bit key KKR in register 42R. K in register 44 is then alternately encrypted with KKL+ML in encryption device 41, decrypted with KKR+MR in decryption device 43, and encrypted with KKL+ML in encryption device 45. The resultant value Y is denoted e*KK.Cinf(K) for convenience. (The "+" denotes the exclusive-OR operation.)

FIG. 10 illustrates the system of decrypting the 64 bit value Y which is the encrypted cryptographic key K in register 44 with a 128 bit key encrypting key KK (KKL,KKR) in register 42 and a control vector Cinf of arbitrary length in register 90. The steps in FIG. 10 are basically the inverse of those in FIG. 9. The operation consists of first calculating a one-way public hash function of Cinf (using the same one-way public hash function as used in FIG. 9) in the hash function processor 92 to produce a 128 bit result ML, MR. The operation next consists of exclusive-ORing ML with KKL and MR with KKR, respectively, to produce KKL+ML, KKR+MR. K is then alternately decrypted with KKL+ML in decryption device 47, encrypted with KKR+MR in encryption device 48, and decrypted with KKL+ML in decryption device 49. In effect, e*KK.Cinf(K) is decrypted with *KK.Cinf to recover K.

Figure 11:
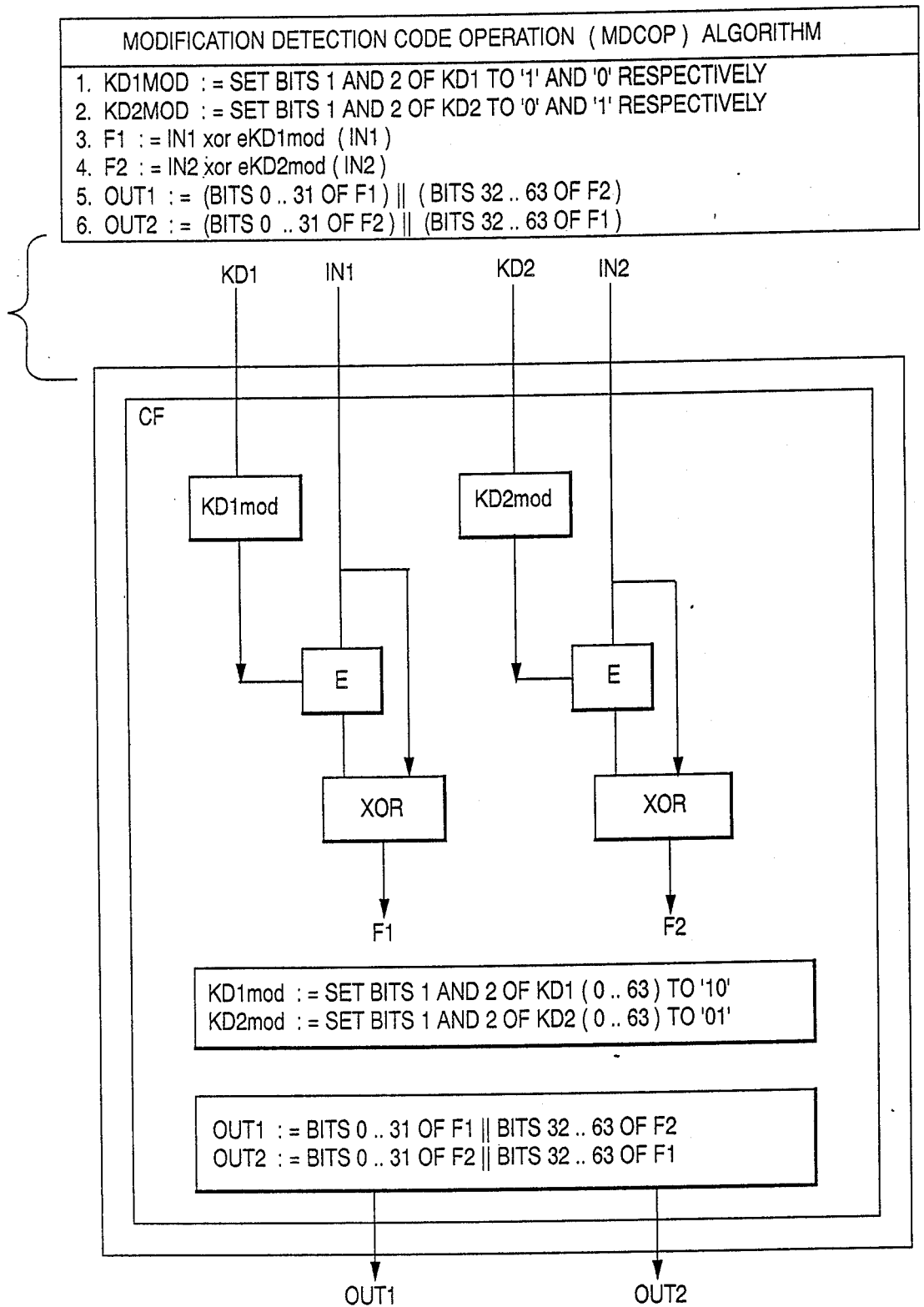
FIG. 11 describes the modification detection code operation (MDCOP), which is employed in the 2- and 4-encryptions, per block MDC algorithms. The figure illustrated the MDCOP algorithm in both text and block diagram forms.

The preferred method of calculating a one-way public hash function in the processor 92 is to make use of the algorithms for calculating modification detection codes (MDCs) described in copending patent application, Ser. No. 090,633, "Data Authentication Using Modification Detection Codes Based on a Public One-Way Encryption Function," by B. Brachtl, et al. reference above. FIG. 11 describes the primitive MDC operation, MDCOP, which is applied in two different systems to calculate an MDC. FIG. 12 illustrates the calculation of a 128 bit MDC using a method requiring two encryption operations per 64 bit input. FIG. 13 illustrates the calculation of a 128 bit MDC using a method requiring four encryption operations per 64 bit input. Both methods require the input a plaintext control vector of arbitrary length to be divided into 64 bit blocks, where padding of the final blocks with hexadecimal digits "FF" is performed as necessary to ensure that every block has 64 bits. The plaintext blocks are processed serially by the MDC algorithm until all blocks are processed. The output of the function is a 128 bit MDC.

In the case of Cinf, the control vector is divided into blocks C1, C2, ..., Cn where Cn is padded on the right with hexadecimal 'FF' (with as many bytes of "FF" as necessary) to make Cn eight bytes. The padding step is performed, as necessary by the cryptographic hardware (i.e. it is an integral part of the one-way public hash function itself). Blocks C1, C2, ..., Cn are then operated on with the MDC algorithm (either the two encryption or four encryption per block method) to produce a 128 bit MDC. The left-hand part of the 128 bit MDC (denoted ML) is exclusive-ORed with KKL to form KKL+ML and the right-hand part of the 128 bit MDC (denoted MR) is exclusive-ORed with KKR to form KKR+MR.

It is very important for maximum security that a strong one-way function, such as the MDC algorithm, be employed to calculate the so-indicated 128 bit hash value on the arbitrary length control vector. This is necessary to prevent an adversary from finding two different valid control vectors C1 and C2, which yield the same hash value. If such a pair, C1 and C2, could be found, where $MDC(C1) = MDC(C2)$, then the integrity of the process would be violated. To illustrate why this is so, consider an example where C1 permits encipher only of data and C2 is some control vector which, among other things, permits decipher of data. Now, if it is known that an encrypted data key has control vector C1, then security is easily subverted by any insider by simply specifying C2 instead of C1. That is, the adversary passes the encrypted data key and C2 to a decipher instruction, together with intercepted ciphertext that has been enciphered with the subject data key by the unsuspecting user, and the decipher instruction is unable to detect that C2 is invalid or unable to prevent the correct data key from being recovered internally within the CF and consequently unable to prevent the data from being decrypted.

Figure 22:
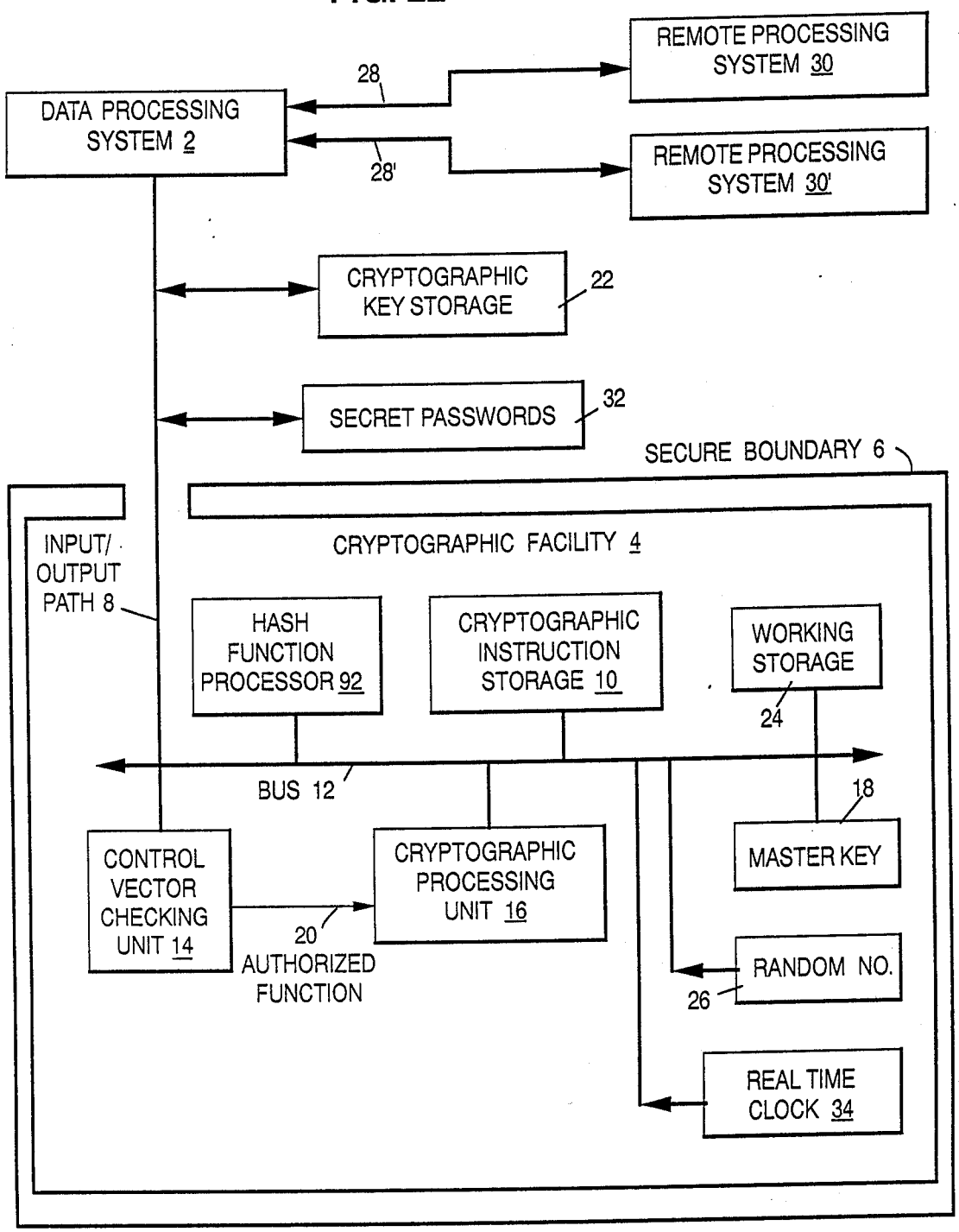
FIG. 22 illustrates a cryptographic facility for arbitrary length control vectors.

FIG. 22 is provided to show how the hash function processor 92 can be connected to the bus 12 in the cryptographic facility 4. Although the hash function processor 92 can be a part of the cryptographic processing unit 16, it can also be a separate processor connected to the bus 12. The hash function processor 92 performs the one-way public hash function described above, on the control vector.

Cryptographic Separation Among Control Vectors

The reader will appreciate that a cryptographic implementation based on 64 bit control vectors only, or 128 bit control vectors only, or arbitrary length control vectors only can be securely implemented using methods prescribed herein and as defined to this point in the invention. However, systems may exist where it is desired, and even necessary for the methods to coexist (i.e. to be implemented within the same cryptographic system). In that case, it is absolutely essential, for reasons of achieving cryptographic security, for the methods to be separated cryptographically. In other words, it must be infeasible for an insider adversary to cheat such that the cryptographic hardware accepts an encrypted key under one method of control vector specification where the key has been encrypted using a different method of control vector specification. For example, if e*KK.C128(K) denotes a key encrypted using a 128 bit control vector, the cryptographic interface should be such that it is impossible to claim that e*KK.C128(K) is a key encrypted using a 64 bit control vector in such a way that the cryptographic hardware decrypts and recovers K from e*KK.C128(K). This is because C128 and C64 could possibly have conflicting specifications such that C128 does not permit a certain key usage whereas C64 does.

One obvious difficulty with the above definitions is this. It could happen, in a particular implementation, that the left and right halves of a 128 bit control vector are equal (i.e., legitimately) and CL may represent a valid 64 bit control vector C. A somewhat artificial example will illustrate the problem. Suppose that bit 13 in CL, in CR and in C is set = B'1' and that all other bits are set = B'0'. In CL, bit 13 = B'1' says that the encrypted cryptovariable X (suppose X is a key) can be used to encipher data only. Bit 13 in CR further restricts the encryption operation in some way (e.g., requiring the user to first enter a password, or restricting the encryption operation to be performed only between the hours of 8:00a.m. and 4:30 p.m.). However, bit 13 in control vector C (i.e., the 64 bit control vector) means that X can be used to decrypt data. If Y denotes the encrypted value of X using CL, CR and KL, KR, then an insider adversary could cheat by asking the cryptographic device to decrypt Y using C and KL, KR. In the latter case, the adversary would be permitted to decrypt data with X, which is a right that he should have been denied.

The cryptographic property desired, in this case, is now stated. Let C64, C128, and Cinf denote the methods of encrypting a key K with KK using a 64 bit control vector, a 128 bit control vector, and an arbitrary length control vector, respectively. Let i denote any of the these methods, and let Y denote the encryption of K with KK using control method i. Now if j denotes any one of the methods such that i does not equal j, then the cryptographic hardware must be such that the following holds true. If Y and j are passed to the hardware (i.e., the insider adversary lies and says method j was used when in fact method i was used), then the cryptographic hardware must ensure that cheating is discovered and the operation is aborted, or else the cryptographic hardware must ensure that a random, unpredictable value K' (not equal to K) is produced which is of no use or value to an adversary.

A method for achieving total cryptographic separation among the three methods of control vector definition is illustrated in FIG. 14. The method makes use of a two bit field (say bits i and i+1) in each 64 bit part of each control vector and in each 64 bit part of the MDC calculated on an arbitrary length control vector, such that the bits do not overlap with parity bits in the key. The bits are assigned values such that for a given K and KK, the set of all encrypted values e*KK.C64(K), for all C64, is different from the set of all encrypted values e*KK.C128(K), for all C128, is different from the set of all encrypted values e*KK.Cinf(K), for all Cinf. This guarantees that no encrypted K can be decrypted with more than one control vector. All control vectors, except the correct control vector will result in an incorrectly decrypted value of K' not equal to K.

Control Vector Checking

Figure 6:
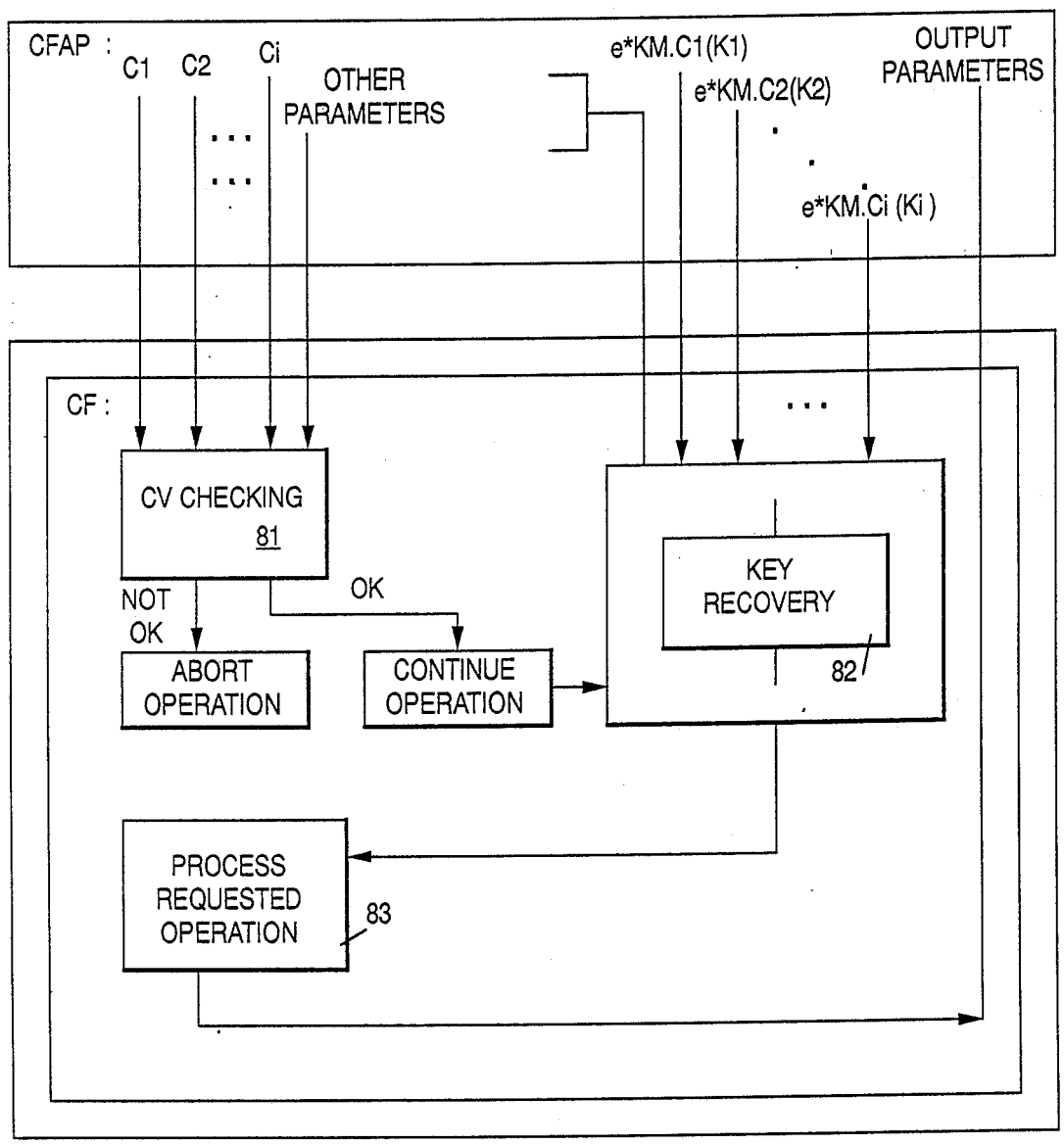
FIG. 6 is a block diagram description of the common processes performed by the cryptographic instructions within the CF.

Control vector checking for a 128 bit control vector is similar to control vector checking for a 64 bit control vector, except that the checking can involve any of the 128 bits whereas for a 64 bit control vector it can involve any of the 64 bits. Thus, the control vector checking logic as detailed in FIG. 6 for a 64 bit control vector is similar to the control vector checking logic that is needed for a 128 bit control vector, except that 128 bit control vectors are provided as inputs to the cryptographic facility instead of 64 bit control vectors.

Control vector checking for a control vector of arbitrary length is similar. That is, checking is still based on the control vector, except now a very long control vector can be present and many more control vector bits and fields may need to be tested. When a control vector of arbitrary length is employed, control vector checking is always based on the control vector -- not on the 128 bit hashed, one-way function of the control vector. This hashed value is calculated internally to the cryptographic facility only and there is no requirement for this hashed value to exist outside the cryptographic facility for the purpose of communicating it from one device to another, or from one cryptographic facility to another, or for the purpose of storing it like a control vector and reentering it into the cryptographic facility. (Although, certainly, there is no loss in security if the hashed value of the control vector is known outside the cryptographic facility, since the hashing algorithm and the control vector are presumed to be publicly known, nonsecret components. The exception to this is when a secret password is incorporated into the control vector, in an alternate embodiment of the present invention.)

Tag-Oriented and Positional Dependent Control Vector Data Structures

In accordance with the invention, as shown in FIG. 15, part "a," a control vector of arbitrary length C can be structured so the control vector consists of a sequence of positional dependent fields, e.g., field 1, field 2, . . . , field n. The fields consist of one or more bits, where each such field has a predefined meaning, interpretation, and intended usage. The 64 bit control vector defined in copending patent applications by S. Matyas, et al. (IBM docket numbers MA9-88-011, MA9-88-012 and MA9-88-013) referenced above, is one which makes use of positional dependent field and bit definitions.

In accordance with the invention, as shown in FIG. 15, part "d," a control vector of arbitrary length C can be structured to consist of fields that are identified not by their position in the control vector but according to a field descriptor. Such a tag-oriented data structure consists of multiple fields, as shown in FIG. 15, part "d," where each such field consists of a fixed length field descriptor, a fixed length field length, and a variable length datum, as shown in FIG. 15, part "b."

In accordance with the invention, as shown in FIG. 15, part "e," a control vector of arbitrary length C can be structured to consist of field identified by field descriptor (i.e., tags), where field length is not prescribed by a length field but is determined on the basis of a field delimiter character of fixed width placed at the end of the datum. In that case, the field delimiter character must not be a valid character in the datum. Such a tag-oriented data structure consists of multiple fields, as shown in FIG. 15, part "e," where each such field consists of a fixed length field descriptor, a variable length datum, and a fixed length field delimiter character, as shown in FIG. 15, part "c."

In accordance with the invention, as shown in FIG. 15, part "f," a control vector of arbitrary length C can be structured to consist of both a positional dependent portion and a tag-oriented portion. The example given, cites a fixed length positional dependent portion of the control vector which appears first and a variable length tag-oriented portion which appears next. Such a data structure may be particularly convenient, since the positional dependent portion could consist of a 128 bit field definition corresponding to a 128 bit control vector and the variable length tag-oriented portion could consist of a control vector extension to the 128 bit fixed portion of the control vector.

The reader will appreciate that many different variations exist for implementing a control vector of arbitrary length to gain architectural simplicity, minimize storage and processing requirements, and to maintain compatibility among implementations of 64 bit control vectors, 128 bit control vectors, and control vectors of arbitrary length, where all three types may coexist in the same cryptographic system or network or connected devices.

Secret Passwords and Control Vectors

Finer control on cryptographic key usage can be obtained by including a secret password in the control vector. This may be particularly advantageous in applications where very high security is required and tight control measures must be employed in managing cryptographic usage (i.e., access control to cryptographic keys).

Figure 16:
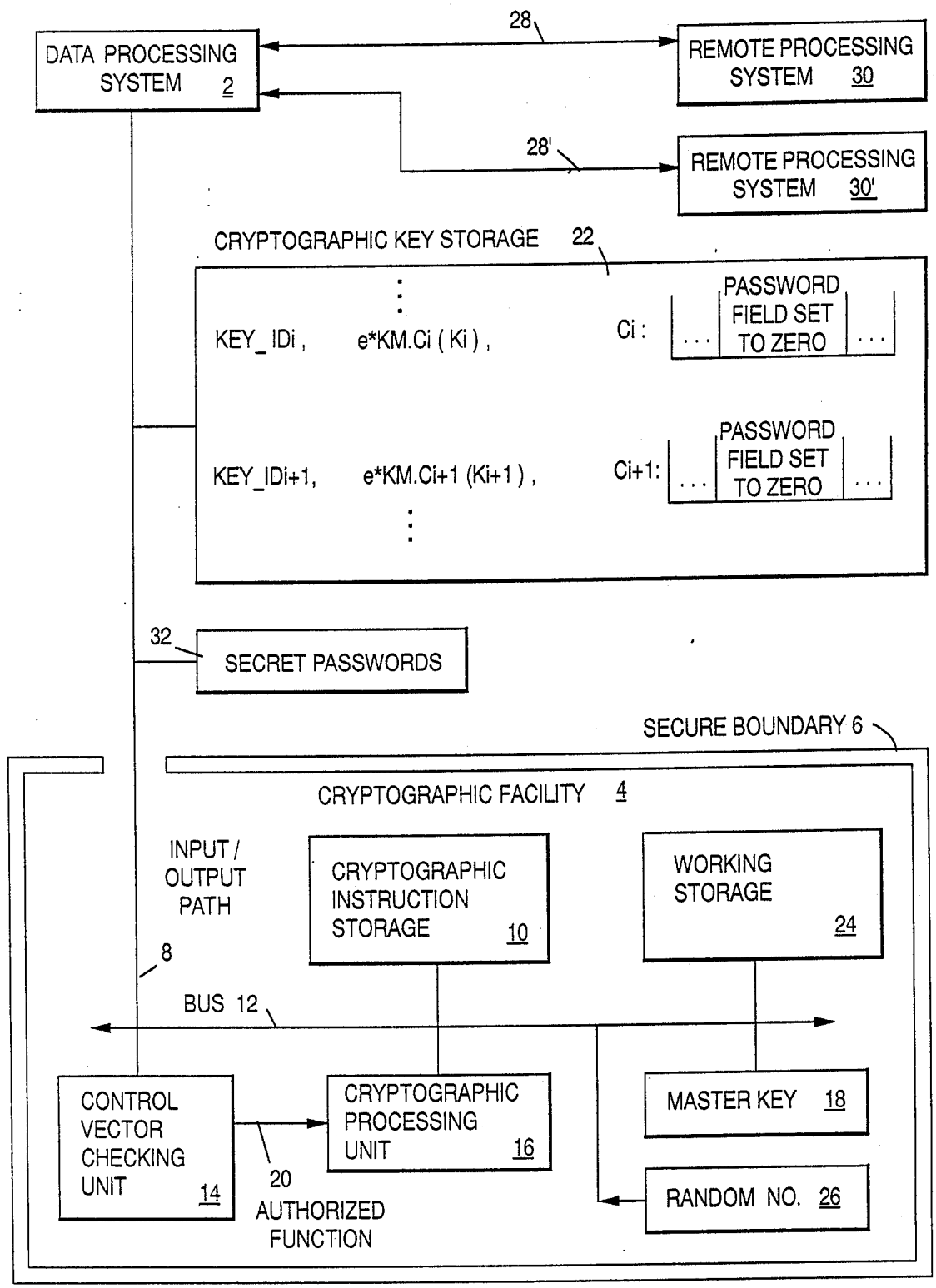
FIG. 16 is a block diagram of a cryptographic processing system which incorporates secret passwords into control vectors.

FIG. 16 gives a block diagram representation of a data processing system with a cryptographic facility therein. In FIG. 16, the data processing system 2 executes a program such as the crypto facility access program and the application programs of FIG. 2 described in copending patent application by Matyas, et al. "Secure Management of Keys Using Control Vectors" (see IBM docket number MA9-88-011) referenced above. These programs output cryptographic service requests for the management of the cryptographic keys which are associated with control vectors. The general format for a control vector is shown in FIG. 10 of the same copending patent application, and as modified and extended by the present invention, and more fully explained below. Control vectors define the functions which the associated key is allowed by its originator to perform. The cryptographic architecture described in the same copending patent application describes a system for validating the key management functions requested for a cryptographic key by the program, and assures that they have been authorized by the originator of the key.

As is shown in FIG. 16 herein, contained within or associated with the data processing system 2 is a cryptographic facility 4 which is characterized by a secure boundary 6. An input/output path 8 passes through the secure boundary 6 for receiving the cryptographic service request, cryptographic keys and their associated control vectors from the program. The input/output path 8 outputs responses to those cryptographic requests from the cryptographic facility. Included within the secure boundary 6 is a cryptographic instruction storage 10 which is coupled by units of the bus 12 to the input/output path 8. A control vector checking unit 14 is coupled to the instruction in storage 10 and a cryptographic processing unit 16 is also coupled to the instruction storage 10. A master key storage 18 is coupled to the cryptographic processing unit 16. The cryptographic facility 4 provides a secure location for executing key management functions in response to the received service request.

The cryptographic instruction storage 10 receives over the input/output path 8 a cryptographic service request for performing a key management function with a cryptographic key. The control vector checking unit 14 has an input coupled to the input/output path 8, for receiving a control vector associated with the cryptographic key. The control vector checking unit 14 also has an input connected to the cryptographic instruction storage 10, for receiving control signals to initiate checking that the control vector authorizes the key management function which is requested by the cryptographic service request.

The control vector checking unit 14 has an authorization output 20 which is connected to an input of the cryptographic processing unit 16, for signaling that key management functions is authorized; the receipt of the authorization signal by the cryptographic processing unit 16 initiates the performance of the requested key management function with the cryptographic key. A cryptographic key storage unit 22 is coupled to the cryptographic facility 14 over the input/output path 8. The cryptographic key storage unit 22 stores the cryptographic key in an encrypted form in which the crypt:ographic key is encrypted under a storage key which is a logical product of the associated control vector and the master key stored in the master key storage 18. Such a logical product is represented as KM.C, where KM is the 128 bit master key KM and C is the control vector. When more than one key and control vector are required for a service request, all control vectors are checked, and all must be found satisfactory in order for an authorization signal to be provided to the cryptographic processing unit 16.

An example of recovering an encrypted key from the cryptographic key storage 22 occurs when the cryptographic instruction storage 10 receives over the input/output path 8 a cryptographic service request for recovering the cryptographic key from the cryptographic key storage unit 22. The control vector checking unit 14 will then output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

The storage key is the exclusive-OR product of the associated control vector and the master key stored in the master key storage 18. Although the logical product is an exclusive-OR operation in the preferred embodiment, it can also be other types of logical operations.

The associated control vector is stored with the encrypted form of its associated cryptographic key in the cryptographic storage 22. Since all keys stored on a cryptographic storage encrypted under the master key, a uniform system for encryption and decryption of encrypted keys thereon can be performed.

In accordance with the invention, as shown in FIG. 16, a system for incorporating a secret password into the control vector is provided. As shown in FIG. 16, the control vector stored with the encrypted form of its associated cryptographic key in the cryptographic key storage 22 has a password field. However, since the password is a secret. quantity, it is not stored in the control vector. Instead, the password field in the control vector is set to zero (i.e., all zero bits). Thus, if the password field is 56 bits in length, then 56 zero bits are stored in this field. The secret passwords themselves are provided to the cryptographic facility 4 via a separate password channel 32 connected to the input/output path 8. Thus, a user who is authorized to have access to a cryptographic key is provided, in advance, with a copy of the secret password. When a cryptographic service request is made which uses a key whose control vector has an associated password, the user must supply the clear form of the password as an additional parameter to the cryptographic service request. Control vector checking proceeds as described above and the control vector checking unit 14 will then output in response thereto, an authorization signal on line 20 to the cryptographic processing unit 16 that the function of recovering the cryptographic key is authorized. The password field in the control vector is not checked in the control vector checking unit 14. The cryptographic processing unit 16 will then operate in response to the authorization signal on line 20, to receive the encrypted form of the cryptographic key from the cryptographic key storage 22 and the clear password via the password channel 32 connected to the input/output path 8 connected to bus 12. The password is then inserted into the control vector, so that the control vector is now complete, and is run through the hash function generator, producing an N-bit hash value. The recovery of the key can go forward as before, i.e., the encrypted cryptographic key is decrypted under the storage key which is a logical product of the N-bit computed hash value of the associated control vector and the N-bit master key stored in the master key storage 18.

Although the password is not checked as part of the key recovery process, or as part of the process of servicing cryptographic service requests, such checking is not required. When the key was originally generated, it was encrypted under the hash value of a control vector which included the password. Later, when the key is to be recovered, if the user supplies an incorrect password, then its associated encrypted key will be decrypted under a storage key which represents a logical product of an incorrect associated control vector and the master key, and hence, and for all practical purposes, a random, unknown, and unpredictable key will be recovered and used in processing the requested cryptographic instruction. The cryptographic instructions in copending patent application by S. Matyas, et al., "Secure Management of Cryptographic Keys Using Control Vectors," referenced above makes use of cryptographic instructions such that instruction outputs are of no value or useful purpose when one or more of the supplied keys are incorrectly recovered.

FIG. 17 describes several ways in which a password can be incorporated into the control vector. In particular, the password can be a positional dependent field in the control vector, as shown in FIG. 17, a part "a," or it can be a field in a tag-oriented structure with field descriptor, field length, and datum, as shown in FIG. 17, part "b," or it can be a field in a tag-oriented structure with field descriptor, datum, and delimiter character, as shown in FIG. 17, part "c." The reader will appreciate that these and other methods can be found to conveniently incorporate the password field into the control vector for the purpose of authorizing the use of a cryptographic key.

Figure 20:
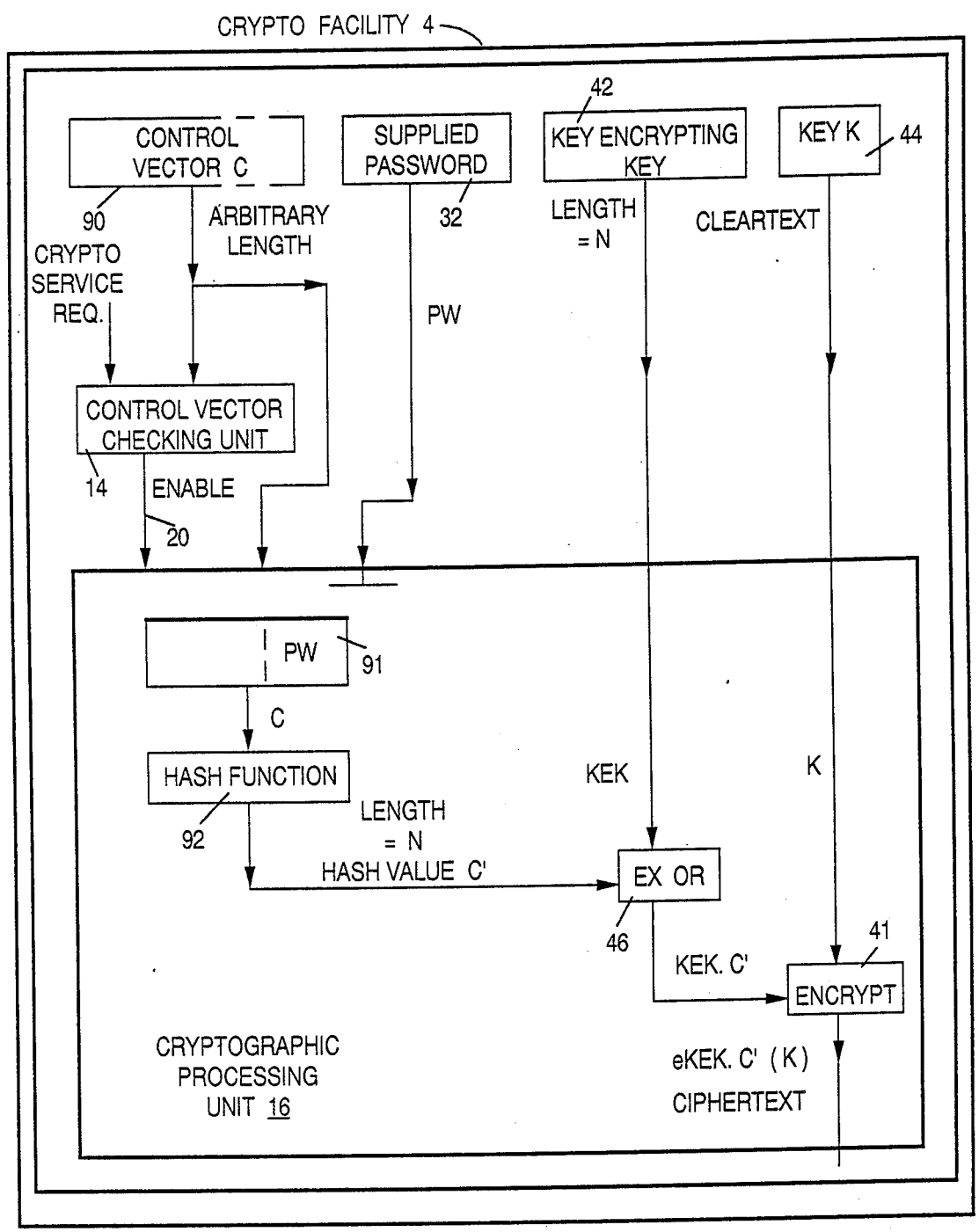
FIG. 20 illustrates encryption with a control vector of arbitrary length, including a password.

FIG. 20 gives another view of the cryptofacility 4 for performing encryptions using a control vector which includes a password (in either cleartext or ciphertext form). The control vector in register 90 is of arbitrary length and includes a vacant (all zeros) field as shown in FIGS. 16 and 17, into which a user-supplied password from password input device 32 is to be inserted in the staging register 91 before inputting the control vector (including the password) to the hash function processor 92. The hash function processor 92 outputs an N-bit hash value which is characteristic of the combined control vector and user-supplied password. The N-bit hash value is then exclusive-ORed in logic 46 with the N-bit key encrypting key KEK to produce a product which is an N-bit computed key value, which will be the key input to the encryption device 41. The ciphertext output by encryption device 41 is characterized by the N-bit hash value of the control vector/password combination. Decryption can be done in the same manner, substituting the decryption device 47 for the encryption device 41 in FIG. 20. When the ciphertext is to be decrypted, if the user supplies the wrong password, which is then put into the control vector, the resultant hash value thereof will not be the correct computed key value necessary to produce a cleartext output from the decryption device 47.

Time Intervals and Control Vectors

Finer control on cryptographic key usage can also be obtained by including date and time information in the control vector. This concept can be implemented in several different forms, although basically one or more time intervals are encoded into the control vector for the purpose of specifying when the associated cryptographic key may or may not be used for processing, i.e., used with a cryptographic service request. Even finer granularity can be obtained by limiting access to keys according to instruction types or parameters within instructions. For example, the control vector can be encoded to permit a key to be used within an encipher instruction during a first period and within a decipher instruction during a second period not equal to the first period. Similarly, access to the key could vary according to other system parameters besides instruction type. For example, the key may be active on system A during a first period and active on system B during a second period. The reader will appreciate that linking periods of time to instructions, systems, users, etc., can be accomplished in many useful ways not specifically defined by the present invention, but which are built upon the basic concept of including time information in the control vector in some way. The use of time information in the control vector may be particularly advantageous in applications where very high security is required, or for particular applications where it is desired to allow key usage for a certain period of time (e.g., which may provide the user access to a certain system resource to allow the user to inspect and become familiar with an application, but which does not give the user unlimited use to the application until the user purchases or subscribes to the application.)

Figure 18:
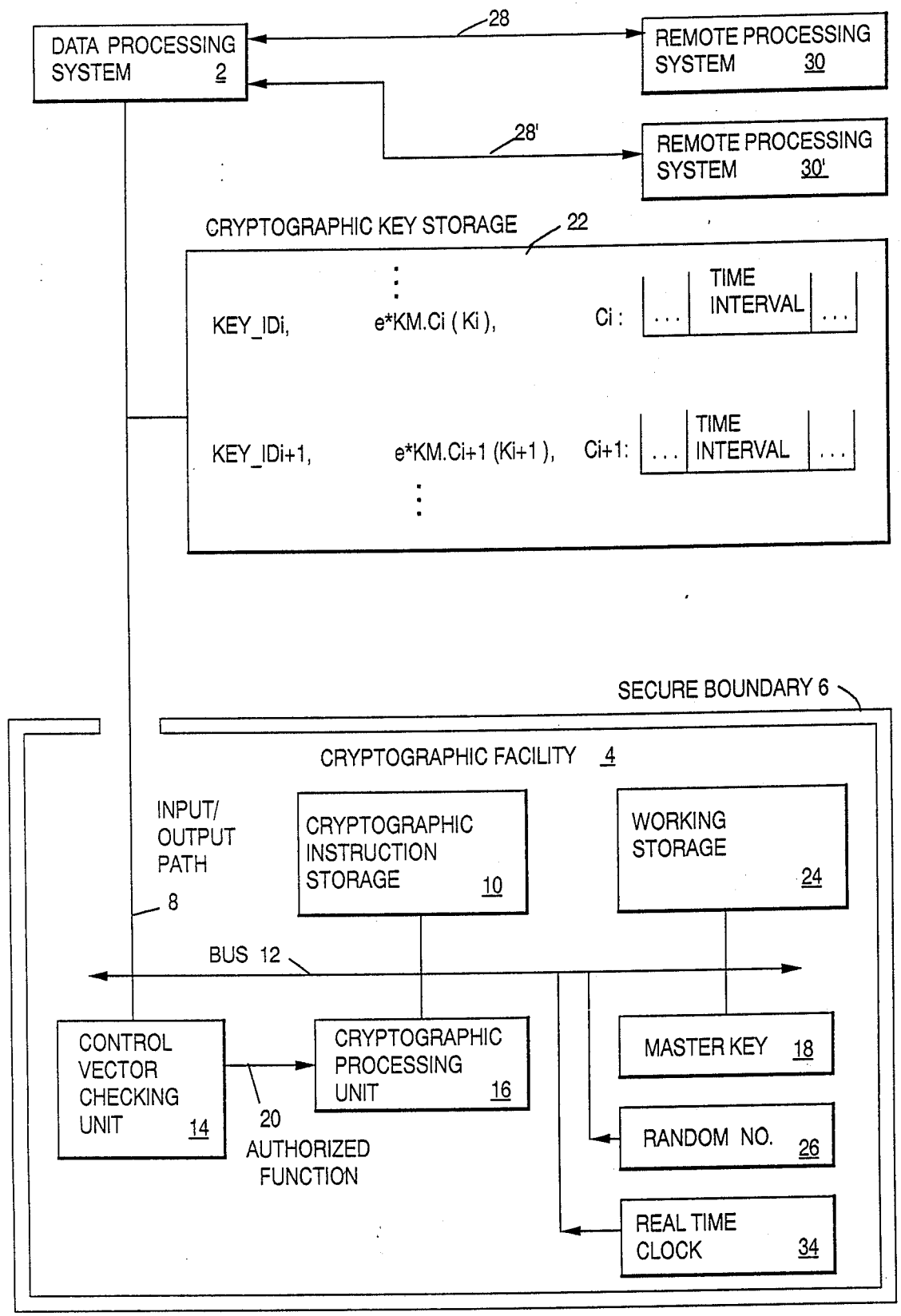
FIG. 18 is a block diagram of a cryptographic processing system which incorporates time information into control vectors.

In accordance with the invention, as shown in FIG. 18, a system for incorporating time information into the control vector is provided. As shown in FIG. 18, the control vector stored with the encrypted form of its associated cryptographic key in the cryptographic key storage 22 has a time interval field, which consists of one or more intervals of time each delineated by a starting date and time and an ending date and time. The cryptographic facility 4 is also equipped with a real time clock 34 connected to bus 12, thus enabling clock values to be read out over bus 12 by control vector checking unit 14. A provision also exists, although not shown in FIG. 18, to initially set the real time clock using a process with integrity. For example, the real time clock 34 would be initialized using a process similar to that whereby the master key 18 is initialized, which is described in copending patent application by S. Matyas, et al., "Secure Management of Cryptographic Keys Using Control Vectors," referenced above and involves a hand-held key entry device connected to a secure front panel entry port with a physical key-activated key switch used for enabling the master key entry process. A different switch position and the same hand-held key entry device could be used to enter a clock value into the real time clock register 34. Other mechanisms for initializing the clock value can be employed. Otherwise, the components in FIG. 18 are exactly the same as the components in FIG. 16, and the description for handling a cryptographic service request described above, except for the exceptions noted below, also similarly describe the process for handling a cryptographic service request when a time interval is incorporated in the control vector and the cryptographic facility has a real time clock, as shown in FIG. 18.

Figure 21:
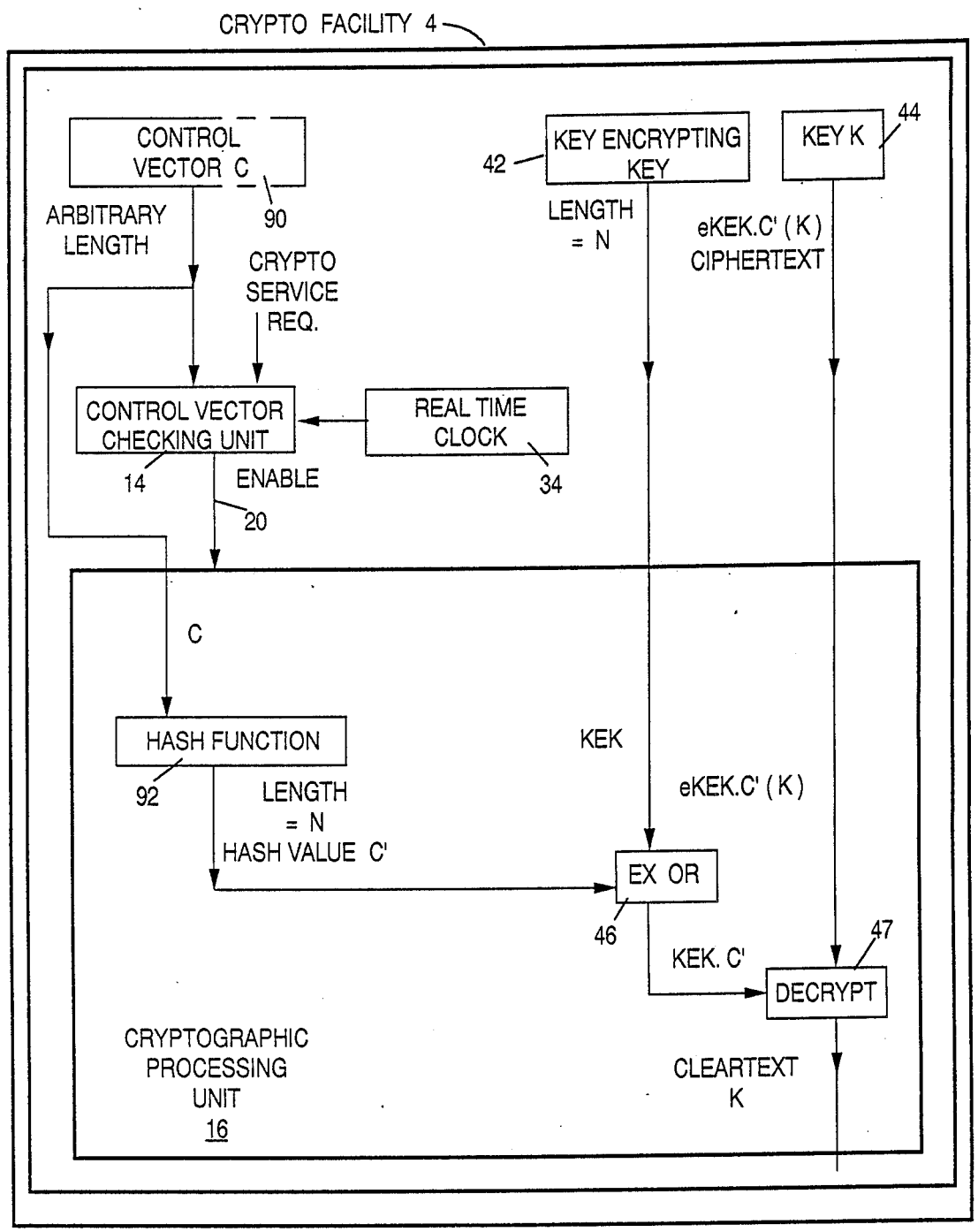
FIG. 21 illustrates decryption with a control vector of arbitrary length, with time interval checking.

In accordance with the invention, as shown in FIG. 18, at the time when a cryptographic service request is made which uses a key whose control vector has an associate time interval field, processing is performed as follows. Control vector checking proceeds as described above except that now an additional check is performed on the stored time information. (The control vector may or may not have an associated password field, but this level of controlled key management is invariant to the checking on the time interval described herein.) Referring to FIGS. 18 and 21, the control vector checking unit 14 accesses the current real time clock value from clock 34 and a check is made to determine that the clock value falls within the time interval specified in the control vector. If more than one time interval is present in the control vector, then the clock value must fall within one of these time intervals (but need not fall within more than one of the intervals). If this check succeeds and also the remainder of the control vector checking succeeds, then control vector checking unit 14 will output in response thereto, an authorization signal on line 20 to the cryptographic processing unit 16 that the function of recovering the cryptographic key is authorized. The cryptographic processing unit 16 will then operate in response to the authorization signal on line 20, to receive the encrypted form of the cryptographic key from the cryptographic key storage 22 and to decrypt the encrypted form under the storage key which is a logical product of the associated control vector and the master key stored in the master key storage 18.

As shown in FIG. 21, the control vector checking unit 14 accesses the real time clock 34 and compares the current time with the periods specified in the control vector C. The control vector checking unit also checks that the control vector C allows the usage specified by the cryptographic service request input thereto. If both of these tests are satisfied, then an enable signal is output on line 20 and the control vector C, which is of arbitrary length, is input to the hash function processor 92 where it is converted into an N-bit hash value C'. The N-bit hash value C' is then exclusive-ORed with the N-bit key encrypting key KEK in the exclusive-OR 46 to reproduce a product which is an N-bit computed key value, which will be the key input to the decryption device 47. (Encryption can be done in the same manner, substituting the encryption device 41, for the decryption device 47 in FIG. 21.)

FIG. 19 further elaborates on the time interval field shown in FIG. 18. More specifically, FIG. 19, part "a" describes the time interval field as one or more intervals consisting of a start date/time and an end date/time. The method for encoding these fields and the measure of time (e.g., hours, minutes, seconds, etc.) is unimportant to the present invention. FIG. 19, part "b" describes a method whereby the time intervals are associated with particular instructions, so that processing with the key is dependent on the instruction required to do that processing. FIG. 19, part "c" describes a method whereby the time intervals are associated with particular systems, so that processing with the key is dependent on the system where the key is to be used. This requires the cryptographic facility to provide the control vector checking unit 14 with a system ID, not shown in FIG. 18, but which could be stored with integrity within the cryptographic facility and accessed as needed. The system ID is initialized into the crypto facility using a process similar to that of initializing the master key or the real time clock value, already described above. Likewise, although not specifically shown, the time interval field could be implemented similarly to the password field, as described in FIG. 15. That is, the time interval could be a positional dependent field in the control vector or it could be a tag-oriented field, and could be implemented in any of the ways already defined and described by FIG. 15 (except that the password field is replaced by a time interval field).

The encryption device 41 and the decryption device 47, in their preferred embodiment, use the ANSI data encryption algorithm (DEA) which is a standard cryptographic algorithm for commercial data security products, and is described in the standard ANSI X2.92-1981 "Data Encryption Algorithm." The DEA is a symmetric block algorithm cipher algorithm that uses a 56-bit secret key to encipher 64 bits of plaintext to form 64 bits of ciphertext. DEA keys are normally stored with one parity bit per byte, forming a 64-bit key. DEA forms the basis for the National Bureau of Standards approved Federal Data Encryption Standard, so it is also called DES. However, other embodiments for the encryption device 41 and decryption device 47 can be chosen as being more suitable for particular applications. Alternate encryption algorithms can be employed with different key and block sizes than those employed in the DEA.

The preferred embodiment for the one-way public hash function performed in the hash function processor 92 is by making use of the algorithm for calculating modification detection codes (MDC) described in the copending patent application Ser. No. 090,633, "Data Authentication Using Modification Detection Codes Based on a Public One-Way Encryption Function," by B. Brachtl, et al., referenced above. However, alternate hash functions can be employed for converting the arbitrary length control vector in the storage register 90, into a hash value having a different length suitable for exclusive-ORing with the key portion, in accordance with the invention. Where the key portion length is 64 bits, a hash value length of 64 bits will be required to enable the performance of an exclusive-OR therebetween in accordance with the invention. If the key portion length is 128 bits, then the hash value length must also be 128 bits. If an alternative key portion length value is employed, then an equivalent alternative hash value length must also be employed, in order to enable exclusive-ORing the key portion with the hash value in the exclusive-OR 46, in accordance with the invention. A portion of the hash value can be exclusive-ORed with a portion of (or the whole) key having the same bit length.

In an alternate embodiment of the invention, clear keys can be stored in the crypto facility for immediate availability in cryptographic operations. Those clear keys can be stored for example in the working storage 24 in FIG. 22. In a first method, each key and its associated control vector are stored as a paired expression in the random access memory (RAM) working storage 24 of the crypto facility. During routine operations, in order to access a particular key, the associated control vector is first accessed and the control vector checking operation is carried out as has been previously described, in order to ensure that the proposed key usage is authorized. If the proposed usage is authorized, then the corresponding key is accessed from the working storage and is used for the intended operations within the crypto facility. In a second method, the exclusive-OR product of the key and the hash value of its associated control vector are stored in the working storage inside the crypto facility. The arbitrary length control vector, itself, can either be stored in association with the key/hash value product in the working storage or alternately the arbitrary length control vector can be supplied on the input path 8. During routine operations, in order to access a particular key, the associated arbitrary length control vector is first accessed from the working storage or alternately is first received over the input path 8 and the control vector checking operation is carried out as has been previously described, in order to ensure that the proposed key usage is authorized. If the usage is authorized, then the arbitrary length control vector is processed through the hash function processor 92 to produce the hash value. Then, the exclusive-OR product of the key and its associated hash value of the control vector is accessed from the working storage and exclusive-ORed with the hash value just computed by the hash function processor 92, resulting in the key which can then be used in the requested cryptographic operations. In a third method, for a 128-bit key and 128-bit hash value, the left half of the key can be exclusive-ORed with the left half of the hash value and stored in the working storage and the right half of the key can be exclusive-ORed with right half of the hash value and stored in the working storage. In a fourth method, if the key is a 64-bit key and the hash value is 128-bit hash value, then the 64-bit key, can be exclusive-ORed with the left half of the hash value and stored in the working storage and the 64-bit key can be exclusive-ORed with the right half of the 128-bit hash value and stored in the working storage. Each of these methods has the advantage that encryption and decryption operations on the key need not be conducted to recover the key, as long as the key is stored in the clear text form inside the secure boundary of the crypto facility, thereby enhancing the speed of operations. Other logic functions besides the exclusive-OR, can be used to combine the hash value of the control vector with its associated key for storing in the working storage 24.

Although specific embodiments of the invention have been disclosed, it will be understood by those having skill in the art that minor changes can be made to the specific embodiments disclosed, without departing from the spirit and the scope of the invention.

What is claimed is:

1. In a data processing system which outputs cryptographic service requests for operations with cryptographic keys which are associated with control vectors defining the functions which each key is allowed by its originator to perform, an improved apparatus to enable the use of control vectors having a given length, comprising:

a control vector input for receiving a control vector of a given length associated with an N-bit cryptographic key;

a control vector checking means having an input coupled to said control vector input and input for receiving a cryptographic service request, for checking that said control vector authorizes the cryptographic function which is requested by said cryptographic service request, and outputting an enable signal;

a hash function generator having an input coupled to said control vector input and an N-bit output, for mapping said control vector into an N-bit hash value;

a key input for receiving said N-bit cryptographic key;

a logic block having a first input coupled to said N-bit output of said hash function generator, and a second input coupled to said key input, for forming at the output thereof a computed key value which is a product of said N-bit key and said N-bit hash value;

a cryptographic transformation device having a first input for receiving input information and a key value input coupled to the output of said logic block, for forming output information which has been cryptographically transformed from said input information using said computed key value;

said cryptographic transformation device coupled to said enable signal output from said control vector checking means for inhibiting said formation of said cryptographically transformed output information if said control vector checking means determines that said requested cryptographic function is not authorized by said control vector.

2. The apparatus of claim 1, wherein said control vector has a length greater than N-bits.

3. The apparatus of claim 1, wherein said control vector has a length equal to 2 N-bits.

4. The apparatus of claim 1, wherein said control vector has fields at predetermined locations having bit values therein with a predefined meaning.

5. The apparatus of claim 1, wherein said control vector has a tag definition field which selectively determines the meaning of other fields in said control vector.

6. The apparatus of claim 1, wherein said control vector has fields which determine periods during which said N-bit cryptographic key associated therewith can be used and which exclude such use at other times.

7. The apparatus of claim 1, wherein said control vector has fields which represent a user password which prevents unauthorized users from using said N-bit cryptographic key associated therewith.

8. The apparatus of claim 1, wherein said control vector includes fields uniquely representing its length-class, to prevent an N-bit hash value formed by said hash function generator from equalling an N-bit hash value for a second control vector having a different length-class.

9. The apparatus of claim 1, wherein said control vector has a field which specifies selected lengths of associated fields therein.

10. The apparatus of claim 1, wherein said control vector has a length determined by the location of delimiter fields therein.

11. The apparatus of claim 1, wherein said control vector has a length determined by a tag field therein.

12. The apparatus of claim 1, which further comprises:
a password input;
said control vector having a vacant field reserved for a password received from said password input;
said control vector, with said password inserted in said vacant field, being input to said hash function generator.

13. The apparatus of claim 12, wherein said vacant field of said control vector occupies a fixed position therein.

14. The apparatus of claim 12, wherein: said vacant field of said control vector is identified by an associated field descriptor in said control vector.

15. The apparatus of claim 14, wherein said vacant field of said control vector has a selectable length identified by an associated length field in said control vector.

16. The apparatus of claim 14, wherein said vacant field of said control vector has a length terminated by a delimiter character in said control vector.

17. The apparatus of claim 1, which further comprises:
a real-time clock coupled to said control vector checking unit, for providing a time value;
said control vector having a field specifying a time interval, during which said N-bit cryptographic key associated therewith can be used;
said control vector checking means accessing said time value from said real-time clock and checking whether said time value is within said time interval specified by said control vector and inhibiting said outputting of said enabling signal therefrom if said time value is not within said time interval.

18. The apparatus of claim 17, wherein said control vector specifies a time interval during which said associated N-bit cryptographic key can be used with a specified cryptographic instruction.

19. The apparatus of claim 18, wherein said control vector contains a first time interval during which said cryptographic key can be used with a first cryptographic instruction and said control vector contains a second time interval during which said cryptographic key can be used with a second cryptographic instruction.

20. The apparatus of claim 17, wherein said control vector specifies a time interval during which said associated N-bit cryptographic key can be used with a specified data processing system.

21. The apparatus of claim 20, wherein said control vector contains a first-time interval during which said cryptographic key can be used with a first specified data processing system and said control vector contains a second time interval during which said cryptographic key can be used with a second data processing system.

22. The apparatus of claim 17, wherein said control vector specifies a time interval during which said associated N-bit cryptographic key can be used by a specified user.

23. The apparatus of claim 22, wherein said control vector contains a first-time interval during which said cryptographic key can be used by a first user and said control vector contains a second-time interval during which said cryptographic key can be used by a second user.

24. The apparatus of claim 17, wherein said control vector specifies a plurality of time intervals during which said associated cryptographic key can be used.

25. The apparatus of claim 17, wherein said control vector contains a time interval specified by a start date and start time of day and by a stop date and a stop time of day.

26. The apparatus of claim 17, wherein said control vector contains a time interval field which occupies a fixed position in said control vector.

27. The apparatus of claim 17, wherein said control vector contains a time interval field which is identified by an associated tag field in said control vector.

28. The apparatus of claim 1, wherein said hash function generator performs a one-way public hash function on said control vector.

29. The apparatus of claim 1, wherein said logic block performs an exclusive-OR function between said N-bit key and said N-bit hash value.

30. The apparatus of claim 1, wherein said cryptographic transformation device is an encryption device.

31. The apparatus of claim 1, wherein said cryptographic transformation device is a decryption device.

32. The apparatus of claim 1, wherein said apparatus is contained within a cryptographic facility characterized by a secure boundary.

33. In a data processing system which outputs cryptographic service requests for operations with cryptographic keys which are associated with control vectors defining the functions which each key is allowed by its originator to perform, an improved apparatus to enable the use of control vectors having a length of 2N-bits comprising:
a control vector input for receiving a control vector of 2N-bits in length, associated with a 2N-bit length cryptographic key;
said control vector having a left portion CL of N-bits in length and a right portion CR of N-bits in length;
said cryptographic key having a left portion KKL of N-bits in length and a right portion KKR of N-bits in length;
a first exclusive-OR logic block coupled to receive CL and KKL to form the exclusive-OR product KKL+CL as a first key value;
a second exclusive-OR logic block coupled to receive CR and KKR and to form the exclusive-OR product KKR+CR as a second key value;
a first encryption device having a cleartext input and a key input coupled to receive said first key value and having an output;

a first decryption device having an input connected to an output of said first encryption device and a key input coupled to receive said second key value, and an output;

a second encryption device having an input connected to the output of said decryption device and a key input coupled to receive said first key value, and an output for producing a ciphertext which is a transformation of the cleartext input to said first encryption device.

34. In a data processing system which outputs cryptographic service requests for operations with cryptographic keys which are associated with control vectors defining the functions which each key is allowed by its originator to perform, an improved apparatus to enable the use of control vectors having 2N-bits length, comprising:

a control vector input for receiving a control vector having 2N-bits length associated with a 2N-bit cryptographic key;

a control vector checking means having an input coupled to said control vector input and an input for receiving a cryptographic service request for checking that said control vector authorizes the cryptographic function which is requested by said cryptographic service request, and outputting an enable signal;

said control vector having a left portion CL of N-bits in length and a right portion CR of N-bits in length;

said cryptographic key having a left portion KKL of N-bits in length and a right portion KKR of N-bits in length;

a first exclusive-OR logic block which is coupled to receive CL and KKL and to produce the exclusive-OR product KKL+CL which is a first key value;

a second exclusive-OR logic block which is coupled to receive CR and KKR and to produce the exclusive-OR product KKR+CR which is a second key value;

a first decryption device having an input for receiving ciphertext, a key input coupled to receive said first key value and an output;

an encryption device having an input connected to the output of said first decryption device, a key input coupled to receive said second key value, and an output;

a second decryption device having an input connected to said output of said encryption device, a key input coupled to receive said first key value, and an output for producing cleartext from said ciphertext input to said first decryption device.

35. In a data processing system which outputs cryptographic service requests for operations with cryptographic keys which are associated with control vectors defining the functions which each key is allowed by its originator to perform, an improved method to enable the use of control vectors having a given length, comprising the steps of:

receiving a control vector having a given length, associated with an N-bit cryptographic key;

checking that said control vector authorizes the cryptographic function which is requested by a cryptographic service request;

mapping said control vector into an N-bit hash value;

forming a computed key value which is a product of said N-bit key and said N-bit hash value;

cryptographically transforming input information using said computed key value, into output information;

selectively inhibiting said formation of said cryptographically transformed output information if said control vector checking determines that said requested cryptographic function is not authorized by said control vector.

36. The method of claim 35 which further comprises the steps of:

receiving a password;

inserting said password in a vacant field of said control vector prior to mapping said control vector into said N-bit hash value.

37. The method of claim 35 which further comprises the steps of:

checking whether a time-value is within a time interval specified by said control vector;

inhibiting said formation of said cryptographically transformed output information if said time value is not within said time interval specified by said control vector.

38. The apparatus of claim 32, which further comprises:

a working key storage within said cryptographic facility, for providing a secure location for the storage of working keys.

39. The apparatus of claim 38, which further comprises:

said working key storage storing a plurality of working keys and their associated control vectors in clear text form.

40. The apparatus of claim 38, which further comprises:

said working keys being stored in said working key storage as the exclusive-OR product of each key with its respective hash value of its associated control vector.

41. The apparatus of claim 1, wherein said N-bit cryptographic key is a one-half portion of a 2N-bit cryptographic key and said N-bit hash value is a one-half portion of a 2N-bit hash value.

* * * * *